(12) United States Patent
Shigemitsu et al.

(10) Patent No.: US 8,462,448 B2
(45) Date of Patent: Jun. 11, 2013

(54) IMAGE SENSING MODULE, IMAGING LENS AND CODE READING METHOD

(75) Inventors: Norimichi Shigemitsu, Osaka (JP); Kazuya Kitamura, Osaka (JP); Hiroyuki Hanato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 217 days.

(21) Appl. No.: 12/849,257

(22) Filed: Aug. 3, 2010

(65) Prior Publication Data
US 2011/0032410 A1 Feb. 10, 2011

(30) Foreign Application Priority Data
Aug. 7, 2009 (JP) ................. 2009-185037

(51) Int. Cl.
| G02B 3/02 | (2006.01) |
| G02B 13/18 | (2006.01) |
| G02B 9/00 | (2006.01) |
| G02B 9/08 | (2006.01) |
| G02B 13/16 | (2006.01) |
| H04N 3/14 | (2006.01) |
| H04N 5/335 | (2006.01) |
| H04N 5/225 | (2006.01) |

(52) U.S. Cl.
USPC ........... 359/716; 359/708; 359/739; 348/294; 348/335

(58) Field of Classification Search
USPC ......... 348/207.99, 222.1, 294–324, 335–340; 359/642, 648, 651, 708–716, 721, 727–729, 359/738–739
See application file for complete search history.

(56) References Cited

U.S. PATENT DOCUMENTS

| 5,418,356 | A | 5/1995 | Takano |
| 5,739,965 | A | 4/1998 | Ohno |
| 6,122,009 | A | 9/2000 | Ueda |
| 6,744,570 | B1 | 6/2004 | Isono |
| 7,436,604 | B1 | 10/2008 | Tang |
| 7,466,911 | B2 * | 12/2008 | Isono ......................... 396/111 |
| RE40,638 | E | 2/2009 | Saito |

(Continued)

FOREIGN PATENT DOCUMENTS

| CN | 1892279 A | 1/2007 |
| CN | 2890966 Y | 4/2007 |

(Continued)

OTHER PUBLICATIONS

U.S. Appl. No. 13/005,877, filed Jan. 13, 2011 entitled "Image Pickup Lens, Image Pickup Module, and Portable Information Device", filed Jan. 13, 2011, inventor Shigemitsu et al. (not yet published).

(Continued)

Primary Examiner — Michael Osinski
(74) Attorney, Agent, or Firm — Nixon & Vanderhye P.C.

(57) ABSTRACT

In order to produce, for example, an image sensing module which has a resolving power enough to meet required specifications for both photographing a close object and photograph a far object, and which has a simple structure, an image sensing module includes: an imaging lens having an increased depth of field and a decreased curvature of field; and a sensor provided between (i) a location of a best image surface of the imaging lens with respect to white light from a sunflower and (ii) a location of a best image surface of the imaging lens with respect to white light from a tree.

8 Claims, 14 Drawing Sheets

U.S. PATENT DOCUMENTS

| | | |
|---|---|---|
| 7,688,523 B2 | 3/2010 | Sano |
| 7,755,854 B2 | 7/2010 | Sano |
| 7,764,442 B2 | 7/2010 | Teraoka |
| 7,852,573 B2 | 12/2010 | Teraoka et al. |
| 7,916,405 B2 * | 3/2011 | Aoi et al. ............... 359/784 |
| 7,957,076 B2 | 6/2011 | Tang |
| 8,310,770 B2 * | 11/2012 | Tang et al. ............... 359/784 |
| 2001/0003494 A1 | 6/2001 | Kitagawa |
| 2003/0048549 A1 | 3/2003 | Sato |
| 2003/0063396 A1 | 4/2003 | Saito |
| 2003/0184883 A1 | 10/2003 | Sato et al. |
| 2003/0197956 A1 | 10/2003 | Yamakawa |
| 2004/0047274 A1 | 3/2004 | Amanai |
| 2004/0105173 A1 | 6/2004 | Yamaguchi et al. |
| 2004/0160680 A1 | 8/2004 | Shinohara |
| 2004/0228009 A1 | 11/2004 | Kamo |
| 2005/0002117 A1 | 1/2005 | Ninomiya et al. |
| 2005/0041306 A1 | 2/2005 | Matsuo |
| 2005/0068640 A1 | 3/2005 | Sato |
| 2005/0073753 A1 | 4/2005 | Sato |
| 2005/0073754 A1 | 4/2005 | Sato |
| 2005/0105194 A1 | 5/2005 | Matsui |
| 2005/0128597 A1 | 6/2005 | Amanai |
| 2006/0209429 A1 | 9/2006 | Sato et al. |
| 2006/0238898 A1 | 10/2006 | Shinohara |
| 2007/0008625 A1 | 1/2007 | Park et al. |
| 2007/0010122 A1 | 1/2007 | Wang |
| 2007/0070518 A1 | 3/2007 | Muratani et al. |
| 2007/0127141 A1 | 6/2007 | Saito |
| 2007/0127142 A1 | 6/2007 | Saito |
| 2007/0133108 A1 | 6/2007 | Saito |
| 2007/0195432 A1 * | 8/2007 | Nakamura ............... 359/784 |
| 2007/0229986 A1 * | 10/2007 | Sato et al. ............... 359/784 |
| 2008/0043346 A1 | 2/2008 | Sano |
| 2008/0080028 A1 * | 4/2008 | Bakin et al. ............... 358/514 |
| 2008/0100926 A1 * | 5/2008 | Chen et al. ............... 359/717 |
| 2008/0174879 A1 * | 7/2008 | Chen ............... 359/675 |
| 2008/0180816 A1 | 7/2008 | Nakamura |
| 2008/0239138 A1 | 10/2008 | Sano |
| 2008/0266679 A1 * | 10/2008 | Nio ............... 359/784 |
| 2008/0303919 A1 * | 12/2008 | Egawa ............... 348/223.1 |
| 2009/0009889 A1 | 1/2009 | Teraoka |
| 2009/0015944 A1 | 1/2009 | Taniyama |
| 2009/0059392 A1 | 3/2009 | Sano |
| 2009/0086017 A1 | 4/2009 | Miyano |
| 2009/0201593 A1 * | 8/2009 | Isono ............... 359/716 |
| 2009/0257133 A1 | 10/2009 | Sano |
| 2009/0290234 A1 | 11/2009 | Sano |
| 2010/0046096 A1 | 2/2010 | Hirao et al. |
| 2010/0091387 A1 | 4/2010 | Hirao et al. |
| 2010/0097711 A1 | 4/2010 | Saito |
| 2010/0103533 A1 | 4/2010 | Taniyama |
| 2010/0134903 A1 | 6/2010 | Hirao et al. |
| 2010/0134905 A1 | 6/2010 | Hirao et al. |
| 2010/0166413 A1 | 7/2010 | Hirao et al. |
| 2010/0181691 A1 | 7/2010 | Yoshida |
| 2010/0188555 A1 | 7/2010 | Hirao et al. |
| 2010/0321794 A1 | 12/2010 | Hirao et al. |
| 2011/0001865 A1 | 1/2011 | Hirao et al. |
| 2011/0007195 A1 | 1/2011 | Fukuta |
| 2011/0013290 A1 | 1/2011 | Shigemitsu et al. |
| 2011/0032410 A1 | 2/2011 | Shigemitsu et al. |
| 2011/0061799 A1 | 3/2011 | Wang |
| 2011/0205641 A1 | 8/2011 | Shih |
| 2011/0255177 A1 | 10/2011 | Suzuki et al. |
| 2011/0267709 A1 | 11/2011 | Hirao et al. |
| 2011/0310495 A1 | 12/2011 | You |

FOREIGN PATENT DOCUMENTS

| | | |
|---|---|---|
| CN | 101266329 A | 9/2008 |
| CN | 201273959 Y | 7/2009 |
| JP | 59-022009 | 2/1984 |
| JP | 59022009 A | 2/1984 |
| JP | 61-057918 | 3/1986 |
| JP | 61057918 A | 3/1986 |
| JP | 4-191716 A | 7/1992 |
| JP | 7-5358 | 1/1995 |
| JP | 08-334684 A | 12/1996 |
| JP | 9-284617 | 10/1997 |
| JP | 10-104491 | 4/1998 |
| JP | 10-170809 | 6/1998 |
| JP | 2001-221904 A | 8/2001 |
| JP | 2002-098885 A | 4/2002 |
| JP | 2002-296496 A | 10/2002 |
| JP | 2003-029115 | 1/2003 |
| JP | 2003-057538 A | 2/2003 |
| JP | 2003-270526 A | 9/2003 |
| JP | 2003-329922 A | 11/2003 |
| JP | 2004-004620 A | 1/2004 |
| JP | 2004-064460 | 2/2004 |
| JP | 2004-88713 A | 3/2004 |
| JP | 2004-145183 A | 5/2004 |
| JP | 2004-226487 A | 8/2004 |
| JP | 2004-246168 | 9/2004 |
| JP | 2004-246169 | 9/2004 |
| JP | 2004-252067 A | 9/2004 |
| JP | 2004-254259 | 9/2004 |
| JP | 2004-301938 | 10/2004 |
| JP | 2005-018306 | 1/2005 |
| JP | 2005-24581 A | 1/2005 |
| JP | 2005-24889 A | 1/2005 |
| JP | 2005-107254 A | 4/2005 |
| JP | 2005-107368 A | 4/2005 |
| JP | 2005-107369 A | 4/2005 |
| JP | 2005-157154 A | 6/2005 |
| JP | 2005-286536 | 10/2005 |
| JP | 2006-178026 A | 7/2006 |
| JP | 2006-293324 A | 10/2006 |
| JP | 2006-317916 A | 11/2006 |
| JP | 2007-065374 A | 3/2007 |
| JP | 2007-93972 | 4/2007 |
| JP | 2007-155821 A | 6/2007 |
| JP | 2007-156030 A | 6/2007 |
| JP | 2007-156031 A | 6/2007 |
| JP | 2007-212878 A | 8/2007 |
| JP | 2007-293176 A | 11/2007 |
| JP | 2008-33376 A | 2/2008 |
| JP | 2008-46526 A | 2/2008 |
| JP | 2008-76594 A | 4/2008 |
| JP | 2008-107616 A | 5/2008 |
| JP | 2008-185880 A | 8/2008 |
| JP | 2008-242180 A | 10/2008 |
| JP | 2008-281873 A | 11/2008 |
| JP | 2008-309999 A | 12/2008 |
| JP | 2009-14899 A | 1/2009 |
| JP | 2009-018578 A | 1/2009 |
| JP | 2009-20182 A | 1/2009 |
| JP | 2009-023353 A | 2/2009 |
| JP | 2009-47836 A | 3/2009 |
| JP | 2009-53592 A | 3/2009 |
| JP | 2009-80413 A | 4/2009 |
| JP | 2009-098492 A | 5/2009 |
| JP | 2009-151113 A | 7/2009 |
| JP | 2009-157402 A | 7/2009 |
| JP | 2009-251515 A | 10/2009 |
| JP | 2009-251516 A | 10/2009 |
| JP | 2009-258286 A | 11/2009 |
| JP | 2009-282223 A | 12/2009 |
| JP | 2010-72032 A | 4/2010 |
| JP | 2010-101942 | 5/2010 |
| JP | 2010-102162 A | 5/2010 |
| JP | 2010-151935 | 7/2010 |
| JP | 2011-107631 A | 6/2011 |
| TW | 200703636 A | 1/2007 |
| WO | 2009/025275 A1 | 2/2009 |
| WO | 2009/116492 A1 | 9/2009 |

OTHER PUBLICATIONS

U.S. Office Action mailed Aug. 8, 2012 in U.S. Appl. No. 13/053,943.

Office Action mailed Apr. 26, 2012 in U.S. Appl. No. 12/833,313.

U.S. Appl. No. 13/432,566, filed Mar. 28, 2012, entitled "Lens Aligning Device and Image Capturing Lens".

U.S. Appl. No. 13/053,943, filed Mar. 22, 2011, entitled "Image Sensing Lens and Image Sensing Module".

U.S. Appl. No. 13/159,755, filed Jun. 14, 2011, entitled Lens Element, Imaging Lens, and Imaging Module.

U.S. Appl. No. 12/899,763, filed Oct. 7, 2010, entitled "Image Pickup Lens, Image Pickup Module, Method for Manufacturing Image Pickup Lens, and Method for Manufacturing Image Pickup Module" (not yet published).

U.S. Appl. No. 12/887,639, filed Sep. 22, 2010, entitled "Image Pickup Lens, Image Pickup Module, Method for Manufacturing Image Pickup Lens, and Method for Manufacturing Image Pickup Module" (not yet published).

U.S. Appl. No. 12/833,313 mailed Sep. 7, 2012; Shigemitsu.

U.S. Appl. No. 13/053,943 mailed Aug. 8, 2012; Shigemitsu.

* cited by examiner (a)

(b)

(c)

IMAGE SENSING MODULE, IMAGING LENS AND CODE READING METHOD

This Nonprovisional application claims priority under 35 U.S.C. §119(a) on Patent Application No. 2009-185037 filed in Japan on Aug. 7, 2009, the entire contents of which are hereby incorporated by reference.

TECHNICAL FIELD

The present invention relates to an image sensing module arranged to have a resolving power which is enough to meet required specifications for both photographing a close object and photographing a far object; an imaging lens suitably included so as to build the image sensing module; and a code reading method for reading a two-dimensional matrix code such as a QR code (registered trademark) with use of the image sensing module.

BACKGROUND ART

Patent Literature 1 discloses an automatic focusing device in which a focal position of a lens is changed by applying an electric field or a magnetic field to the lens so as to change a refractive index.

Patent Literature 2 discloses an automatic focusing method for an optical device in which method a location of a lens is controlled by supplying an electric signal, obtained in accordance with a distance from an object, to a piezoelectric element so that a thickness of the piezoelectric element is changed.

Patent Literatures 3 and 4 each disclose a lens adjusting device including an adjustment mechanism in which a lens is shifted by rotating an adjusting lever.

Patent Literature 5 discloses an image sensing device in which a gas is injected into a space between a light-transmitting plate and a lens so as to shift the lens.

According to the techniques disclosed in Patent Literatures 1 through 5, a location or focal position of a lens is changed in accordance with a location of an object so that an image sensing module has a resolving power which is enough to meet required specifications for both photographing a close object and photographing a far object.

CITATION LIST

Patent Literature 1

Japanese Patent Application Publication, Tokukaishou, No. 59-022009 A (Publication Date: Feb. 4, 1984)

Patent Literature 2

Japanese Patent Application Publication, Tokukaishou, No. 61-057918 A (Publication Date: Mar. 25, 1986)

Patent Literature 3

Japanese Patent Application Publication, Tokukaihei, No. 10-104491 A (Publication Date: Apr. 24, 1998)

Patent Literature 4

Japanese Patent Application Publication, Tokukaihei, No. 10-170809 A (Publication Date: Jun. 26, 1998)

Patent Literature 5

Japanese Patent Application Publication, Tokukai, No. 2003-029115 A (Publication Date: Jan. 29, 2003)

Patent Literature 6

Japanese Patent Application Publication, Tokukai, No. 2004-064460 A (Publication Date: Feb. 26, 2004)

Patent Literature 7

Japanese Patent Application Publication, Tokukai, No. 2004-301938 A (Publication Date: Oct. 28, 2004)

SUMMARY OF INVENTION

Technical Problem

Each of the techniques disclosed in Patent Literatures 1 through 5, however, requires a mechanism for changing the location or focal position of the lens in accordance with the location of an object. As such, there is a problem that the image sensing module has a complicated structure.

The present invention has been accomplished in view of the above problem. It is an object of the present invention to provide an image sensing module (i) having a resolving power which is enough to meet required specifications for both photographing a close object and photographing a far object and yet (ii) having a simple structure; an imaging lens suitably included so as to build the image sensing module; and a code reading method for reading, with a high resolving power, a two-dimensional matrix code with use of the image sensing module.

Solution to Problem

In order to solve the above problem, an image sensing module of the present invention includes: an imaging lens having an increased depth of field and a decreased curvature of field; and an image sensing element provided between (i) a location of a best image surface of the imaging lens which best image surface is obtained when the imaging lens receives white light from a first object which is closer to the image sensing element than a predetermined location is and (ii) a location of a best image surface of the imaging lens which best image surface is obtained when the imaging lens receives white light from a second object which is farther from the image sensing element than the predetermined location is.

The imaging lens of the above arrangement has an increased depth of field. Thus, in a case where an image is formed with respect to an object within a wide distance range from a close location to a far location, the image is less out of focus. Further, since the imaging lens has a decreased curvature of field, the entire image is less out of focus. According to the image sensing module, which includes the imaging lens sufficiently arranged as above so that an image formed is less out of focus, the image sensing element is provided at the above location. With the arrangement, both in a case where a close object is photographed and in a case where a far object is photographed, the image sensing module can (i) normally photograph an image which is less out of focus and therefore (ii) have a resolving power which is increased to a certain level.

The image sensing module, even in a case where a location and focal position of the imaging lens are both fixed, has a resolving power enough to meet required specifications for both photographing a close object and photographing a far object. It follows that the image sensing module does not require a mechanism for changing the location and focal position of a lens in accordance with a location of an object. As such, the image sensing module has a simple structure.

An imaging lens of the present invention is an imaging lens imaging lens, having an increased depth of field and a decreased curvature of field, said imaging lens forming an image of an object between (i) a location of a best image surface which is obtained when the imaging lens receives white light from the object which is closer to an image forming location than a predetermined location is and (ii) a location of a best image surface which is obtained when the imaging lens receives white light from the object which is farther from the image forming location than the predetermined location is.

The imaging lens of the above arrangement has an increased depth of field. Thus, in a case where an image is formed with respect to an object within a wide distance range from a close location to a far location, the image is less out of focus. Further, since the imaging lens has a decreased curvature of field, the entire image is less out of focus. According to the image sensing module, which includes the imaging lens sufficiently arranged as above so that an image formed is less out of focus, an image is formed at the above location. With the arrangement, both in a case where an image of a close object is formed and in a case where an image of a far object is formed, the imaging lens can (i) normally photograph an image which is less out of focus and therefore (ii) have a resolving power which is increased to a certain level.

The imaging lens, even in a case where its location and focal position are both fixed, can have a sufficiently great resolving power for both forming an image of a close object and forming an image of a far object. It follows that the image sensing module including the imaging lens does not require a mechanism for changing the location and focal position of a lens in accordance with a location of an object. As such, the image sensing module has a simple structure. In other words, the imaging lens is suitably included so as to build the image sensing module.

A code reading method of the present invention is for reading, with use of an image sensing module, a two-dimensional matrix code on a basis of information on pixels which is obtained from a green monochromatic radiation, the image sensing module comprising: an imaging lens having an increased depth of field and a decreased curvature of field; and an image sensing element provided between (i) a location of a best image surface of the imaging lens which best image surface is obtained when the imaging lens receives white light from a first object which is closer to the imaging lens than a predetermined location is and (ii) a location of a best image surface of the imaging lens which best image surface is obtained when the imaging lens receives white light from a second object which is farther from the imaging lens than the predetermined location is, the image sensing element being capable of supplying only information on pixels which is obtained from the green monochromatic radiation, said code reading method, comprising the steps of: finding, on a basis of a pitch of the pixels which is obtained when the green monochromatic radiation is received, first and second values of respective critical resolving performances of the imaging lens and the image sensing element so as to set, as a value of a critical resolving performance of the image sensing module, the first value or the second value, whichever is lower; finding a magnification at which an image is formed by the imaging lens, on a basis of (i) a distance between the imaging lens and the first object, (ii) an angle of view of the image sensing module, and (iii) an image circle diameter of the image sensing element; and finding a size of a two-dimensional matrix code which the image sensing module can read, on a basis of (i) the value of the critical resolving capability of the image sensing module and (ii) the magnification.

With the arrangement, it is possible to increase a resolving power of the image sensing module when a two-dimensional matrix code is read with use of the image sensing module.

Advantageous Effects Of Invention

As described above, an image sensing module of the present invention includes: an imaging lens having an increased depth of field and a decreased curvature of field; and an image sensing element provided between (i) a location of a best image surface of the imaging lens which best image surface is obtained when the imaging lens receives white light from a first object which is closer to the image sensing element than a predetermined location is and (ii) a location of a best image surface of the imaging lens which is obtained when the imaging lens receives white light from a second object which is farther from the image sensing element than the predetermined location is.

As such, the image sensing module of the present invention (i) has a resolving power enough to meet required specifications for both photographing a close object and photographing a far object, and yet (ii) has a simple structure.

As described above, an imaging lens of the present invention is an imaging lens imaging lens, having an increased depth of field and a decreased curvature of field, said imaging lens forming an image of an object between (i) a location of a best image surface which is obtained when the imaging lens receives white light from the object which is closer to an image forming location than a predetermined location is and (ii) a location of a best image surface which is obtained when the imaging lens receives white light from the object which is farther from the image forming location than the predetermined location is.

As such, the imaging lens of the present invention is suitably included so as to build the image sensing module of the present invention.

BRIEF DESCRIPTION OF DRAWINGS

FIG. 1 is a cross-sectional view schematically illustrating an arrangement of an image sensing module in accordance with an embodiment of the present invention.

FIG. 2 is a cross-sectional view schematically illustrating an example detailed structure of an imaging lens in accordance with the embodiment of the present invention.

FIG. 5 is a graph illustrating a relation between (i) another pair of defocus MTFs of the imaging lens with respect to respective white lights from a close object and a far object, and (ii) a location of the image sensing element.

FIG. 6 is a graph illustrating a relation between (i) still another pair of defocus MTFs of the imaging lens with respect to respective white lights from a close object and a far object, and (ii) a location of the image sensing element.

FIG. 7 is a graph illustrating a relation between (i) yet another pair of defocus MTFs of an imaging lens with respect to respective white lights from a close object and a far object, and (ii) the location of the image sensing element.

FIG. 8 is a graph illustrating a relation between (i) defocus MTFs, for different image heights, of an imaging lens, which has a curvature of field, with respect to white light from a far object, and (ii) the location of the image sensing element.

FIG. 9 is a graph illustrating a relation, observed in the image sensing module of the present invention, between (i) change in MTF value and (ii) the distance from the image sensing element to an object.

FIG. 11 is a graph illustrating in detail the defocus MTF of the imaging lens, illustrated in FIG. 10, with respect to white light from a far object.

FIG. 12 is a graph illustrating a relation, observed in the image sensing module serving as the comparative example for the image sensing module of the present invention, between (i) a distance from an image sensing element to an object and (ii) change in MTF value.

FIG. 13 is a graph illustrating a relation among (i) the location of the image sensing element and (ii) defocus MTFs, with respect to white light, of the respective imaging lenses according to the present invention and the comparative example and (iii) a defocus MTF of the imaging lens of present invention with respect to a green monochromatic radiation.

FIG. 14 is a diagram comparing pixels to be used for a normal image sensing and with pixels to be used for a two-dimensional matrix code reading.

FIG. 16 is a graph for explaining how a critical resolving capability of the imaging lens is found.

FIG. 17 is a diagram schematically illustrating a relation between (i) a pixel pitch of the image sensing element and (ii) a pixel pitch for only green pixels of the image sensing element.

FIG. 18 is a diagram illustrating how a magnification of the imaging lens is found.

FIG. 19 is another graph for explaining how the critical resolving capability of the imaging lens is found.

FIG. 20 is a cross-sectional view illustrating an example detailed structure of the image sensing module illustrated in FIG. 1.

FIG. 21 is a cross-sectional view illustrating another example detailed structure of the image sensing module illustrated in FIG. 1.

FIG. 22 is a cross-sectional view illustrating a general method for producing an image sensing module.

FIG. 23 is a cross-sectional view illustrating a method of the present invention for producing an image sensing module.

DESCRIPTION OF EMBODIMENTS

Figure 1:
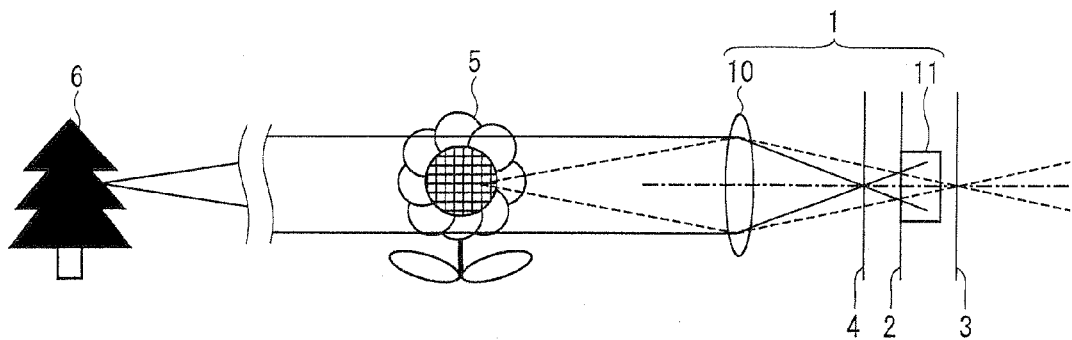
FIG. 1

FIG. 1 illustrates an image sensing module 1 which includes an imaging lens 10 and a sensor (image sensing element) 11.

The imaging lens 10 forms an image of an object. Specifically, the imaging lens 10 forms, on an image surface, an image of an object to be photographed by the image sensing module 1.

The imaging lens 10 is not particularly limited in its detailed structure, provided that the imaging lens 10 is a known lens system which is designed to increase a depth of field and to decrease a curvature of field. An example detailed structure of the imaging lens 10 is described later.

A depth of field stands for a distance between a closest point from a camera and a farthest point from the camera, within which distance an image is regarded as sharp without blurring when a camera lens is fixedly set in a particular location. In other words, a depth of field stands for an entire distance within which a satisfactory sharp image is obtained when a camera lens is focused on an object which is present at a particular distance from the camera lens.

A curvature of field stands for a lens aberration which causes a state in which an image of a planar object is not formed on a plane but on a curved surface. In other words, the lens aberration causes an image of a planar object to be curved. It follows that a periphery of an image blurs when a central portion of the image is brought into focus, whereas the central portion blurs when the periphery is brought into focus.

The sensor 11 receives light indicative of an image of an object formed by the imaging lens 10, converts the light into an electric signal, and then outputs the electric signal. This allows a display device (not shown) to display the image of the object. For example, a solid-state image sensing device such as a charge coupled device (CCD) and a complementary metal oxide semiconductor (CMOS) can be used as the sensor 11.

The sensor 11 is provided in a location (hereinafter referred to as "sensor location") 2 between (i) a location 3 of a best image surface of the imaging lens 10 with respect to white light from a sunflower 5 and (ii) a location 4 of a best image surface of the imaging lens 10 with respect to white light from a tree 6. A best image surface is a general technical term which stands for an imaging surface on which light concentration or resolving power is maximal.

The sunflower 5 is an example object which is to be photographed by the image sensing module 1 and is located close to the image sensing module 1. The sunflower 5 is away from the image sensing module 1 by, for example, a distance of about 300 mm. In other words, the location 3 corresponds to the best image surface on which an image of an object, such as the sunflower 5, which is close to the image sensing module 1 is formed by the imaging lens 10.

The tree 6 is an example object which is to be photographed by the image sensing module 1 and is located far from the image sensing module 1. The tree 6 is away from the image sensing module 1 by, for example, a distance of about 1500 mm. In other words, the location 4 corresponds to the best image surface on which an image of an object, such as the tree 6, which is far from the image sensing module 1 is formed by the imaging lens 10.

An object close to the image sensing module 1 can be discriminated from an object far from the image sensing module 1, for example, as follows. The object close to the image sensing module 1 has a distance from the sensor 11 which distance is smaller than a reference distance (a predetermined distance), whereas the object far from the image sensing module 1 has a distance from the sensor 11 which distance is larger than the reference distance. In a case where an object close to an image sensing module is thus discriminated from an object far from the image sensing module in like manner, the reference distance can be set to a distance between an image sensing element of a conventionally common image sensing module and an object, at which distance two photography modes are preferably switched in the conventionally common image sensing module. According to the two photography modes, location of and/or focal position of a lens, used in case of photographing an object close to the image sensing module, are different from those used in case of photographing an object far from the image sensing module.

In any image sensing module 1, there exists a critical distance (a predetermined distance), such as the above reference distance, which is used in discriminating between an object close to the image sensing module 1 and an object far from the image sensing module 1. A specific value of such a distance can, however, vary from image sensing module 1 to image sensing module 1 in accordance with factors such as properties of the imaging lens 10, a final location of the sensor 11, and/or size of the image sensing module 1. It should thus be understood that such a critical distance is determined for individual image sensing module 1 as appropriate in accordance with various designs and properties of the individual image sensing module 1.

Figure 2:
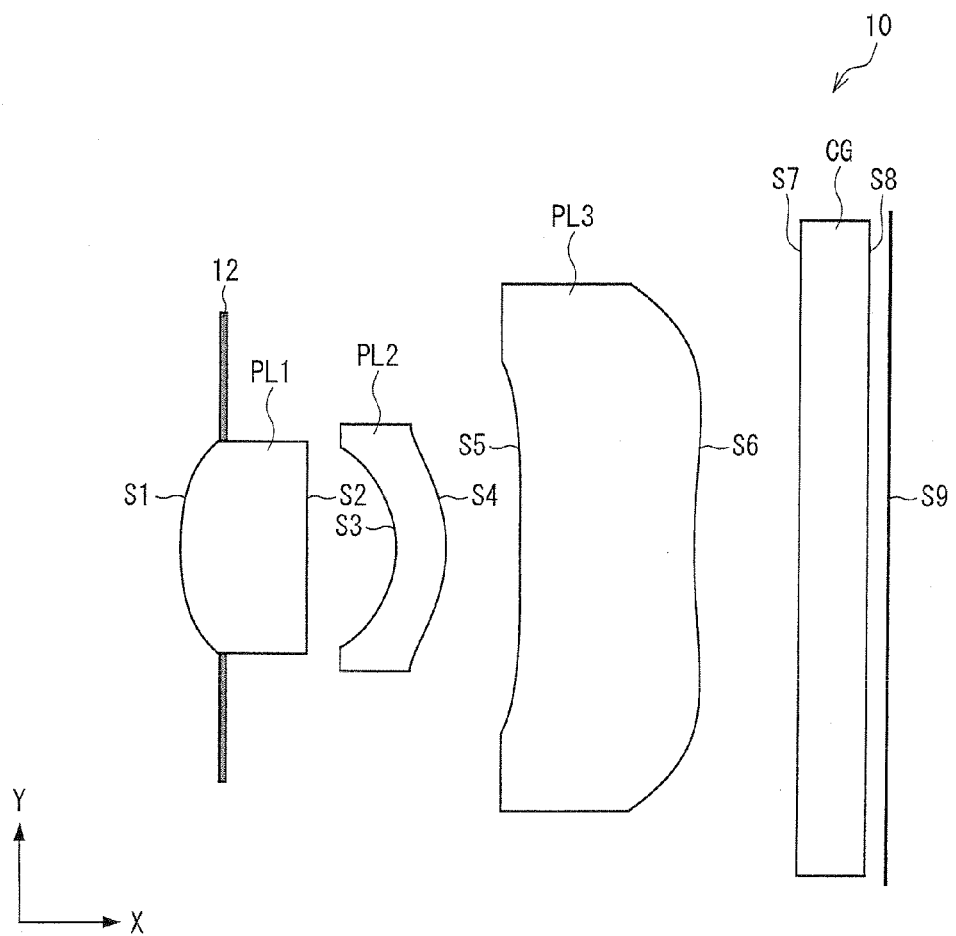
FIG. 2

FIG. 2 illustrates a specific example structure of the imaging lens 10. In the imaging lens 10, the greatest emphasis is placed not on an improvement in resolving power which is obtained when the imaging lens 10 is located so that an image is just focused, but on an increase in depth of field and a decrease in curvature of field.

As illustrated in FIG. 2, the specific example structure of the imaging lens 10 includes an aperture stop 12, a first lens PL1, a second lens PL2, a third lens PL3, and a cover glass (protecting member) CG.

The first lens PL1 has (i) a surface (object-side surface) S1 that faces an object whose image is to be formed and (ii) a surface (image-side surface) S2 that faces an image surface of the imaging lens 10. The second lens PL2 has (i) a surface S3 that faces the object and (ii) a surface S4 that faces the image surface of the imaging lens 10. The third lens PL3 has (i) a surface S5 that faces the object and (ii) a surface S6 that faces the image surface of the imaging lens 10. The cover glass CG has (i) a surface S7 that faces the object and (ii) a surface S8 that faces the image surface of the imaging lens 10. The image surface of the imaging lens 10 is indicated by S9, which corresponds to the sensor location 2 (see FIG. 1).

The aperture stop 12 is provided so as to surround the surface S1 of the first lens PL1. The aperture stop 12 is provided to limit a diameter of a bundle of rays, around an optical axis of the imaging lens 10, of light incident on the imaging lens 10 so that the light incident on the imaging lens 10 can properly pass through the first lens PL1, the second lens PL2, and the third lens PL3.

The first lens PL1 is a known meniscus lens which has a convex surface S1 facing an object. In the case where the first lens PL1 is such a meniscus lens having a convex surface facing an object, a ratio of a total length of the first lens PL1 with respect to a total length of the imaging lens 10 becomes large. With the arrangement, it is possible that a focal length of the entire imaging lens 10 is longer as compared to the total length of the imaging lens 10. This allows the imaging lens 10 to be downsized and to have a low height. The first lens PL1 is designed to have a large Abbe number of about 56 so as to reduce a dispersion of incident light.

The second lens PL2 is a known meniscus lens which has a concave surface S3 facing an object. In the case where the second lens PL2 is such a meniscus lens having a concave surface S3 facing an object, the second lens PL2 can maintain a refracting power and yet have a small Petzval sum (axial property of a curvature of an image of a planar object due to an optical system). This allows reductions in astigmatism, curvature of field, and coma aberration. The second lens PL2 is designed to have a small Abbe number of about 34 so as to increase a dispersion of incident light.

A combination of the first lens PL1 having a large Abbe number and the second lens PL2 having a small Abbe number is effective in correcting a chromatic aberration.

An aspheric lens is employed as each of the first lens PL1, the second lens PL2, and the third lens PL3.

The aspheric first lens PL1 can significantly correct, in particular, a spherical aberration. The aspheric second lens PL2 can significantly correct, in particular, an astigmatism and a curvature of field. The aspheric third lens PL3 can significantly correct, in particular, an astigmatism, a curvature of field, and a distortion.

Further, the aspheric third lens PL3 can improve telecentricity of the imaging lens 10. As such, it is possible to readily increase the depth of field of the imaging lens 10 by reducing a numerical aperture (NA).

The imaging lens 10 illustrated in FIG. 2 thus can have an increased depth of field and a decreased curvature of field.

The cover glass CG is provided between the third lens PL3 and the sensor 11 (see FIG. 1). The cover glass CG covers the sensor 11 so as to protect the sensor 11 against, for example, physical damage.

Table 1 shows an example of design formulae for a lens system of the imaging lens 10.

TABLE 1

| Elements | | | | Curvature | Center thickness | Effective radius | Aspheric coefficients | | |
|---|---|---|---|---|---|---|---|---|---|
| Lens No. | Refractive Index | Abbe number | Surfaces | [mm$^{-1}$] | [mm] | [mm] | K | A4 | A6 |
| PL1 | 1.531 | 56.04 | S1 | 8.74E−01 | 0.738 | 0.680 | 0.00E+00 | −5.03E−03 | 3.94E−02 |
| | | | S2 | 2.47E−01 | 0.553 | 0.690 | 0.00E+00 | −1.94E−02 | −2.97E−01 |
| PL2 | 1.586 | 34.00 | S3 | −1.07E+00 | 0.300 | 0.674 | 0.00E+00 | −2.95E−01 | 8.82E−01 |
| | | | S4 | −7.70E−01 | 0.446 | 0.843 | 0.00E+00 | −2.39E−01 | 8.33E−01 |
| PL3 | 1.531 | 56.04 | S5 | 1.80E−01 | 1.013 | 1.330 | 0.00E+00 | −2.82E−01 | 2.49E−01 |
| | | | S6 | 3.38E−01 | 0.630 | 1.808 | 0.00E+00 | −1.77E−01 | 8.34E−02 |

TABLE 1-continued

| Lens No. | Refractive Index | Abbe number | Surfaces | | | | | | |
|---|---|---|---|---|---|---|---|---|---|
| CG | 1.516 | 64.05 | S7 | — | 0.500 | — | — | — | — |
|  |  |  | S8 | — | 0.050 | — | — | — | — |
| Image surface |  |  | S9 | — | — | 2.240 | — | — | — |

| | Elements | | | Aspheric coefficients | | | | |
|---|---|---|---|---|---|---|---|---|
| Lens No. | Refractive Index | Abbe number | Surfaces | A8 | A10 | A12 | A14 | A16 |
| PL1 | 1.531 | 56.04 | S1 | −2.17E−01 | 7.27E−01 | −8.98E−01 | 2.15E−01 | 0.00E+00 |
|  |  |  | S2 | 105E+00 | −3.32E+00 | 3.84E+00 | −2.69E+00 | 0.00E+00 |
| PL2 | 1.586 | 34.00 | S3 | −4.26E+00 | 1.47E+01 | −2.15E+01 | 6.02E+00 | 0.00E+00 |
|  |  |  | S4 | −1.69E+00 | 4.34E+00 | −5.02E+00 | 2.43E+00 | −2.78E−01 |
| PL3 | 1.531 | 56.04 | S5 | −1.41E−01 | 4.47E−02 | −6.10E−03 | 3.40E−04 | −6.95E−05 |
|  |  |  | S6 | −3.77E−02 | 1.08E−02 | −1.82E−03 | 1.26E−04 | 1.19E−07 |
| CG | 1.516 | 64.05 | S7 | — | — | — | — | — |
|  |  |  | S8 | — | — | — | — | — |
| Image surface |  |  | S9 | — | — | — | — | — |

Table 1 shows a refractive index and Abbe number of a material of each component which are obtained in a case where the incident light is the d line (wavelength of 587.6 nm).

"Center thickness" (center thickness of surface) stands for a distance between a first center of one of two surfaces and a second center of the other of the two surfaces which first and second centers are adjacent on an optical axis, the second center being closer to an image surface. "Effective radius" of a lens stands for a radius of a circular region within which a range of a luminous flux can be controlled.

Each "aspheric coefficient" stands for an i-th order aspheric coefficient $A_i$ (where i is an even number of 4 or larger) in Formula (1), which is an aspheric formula for an aspheric surface. In Formula (1), Z is a coordinate in an optical axis direction (X direction in FIG. 2), x is a coordinate in a direction (Y direction in FIG. 2) normal to the optical axis, R is a radius of curvature (reciprocal of the curvature), and K is a conic coefficient.

$$Z = \frac{x^2 \times \frac{1}{R}}{1 + \sqrt{1 - (1+K) \times x^2 \times \frac{1}{R}}} + \sum_{\substack{i=4 \\ (even\ number)}} A_i \times x^i \quad (1)$$

In Table 1, each value expressed as "(constant a) E (constant b)" means "(constant a) multiplied by 10 to the power of (constant b)". For example, "8.74E−01" means "8.74×10⁻¹".

Table 2 lists an example of specifications of the image sensing module 1.

TABLE 2

| Image circle diameter/mm | 4.48 |
|---|---|
| F-number | 2.8 |
| Angle of view/deg | 60–65 |
| Optical total length/mm | ≦4.3 |
| Sensor pixel pitch/μm | 1.75 |
| Closest object distance/mm | 300 |

"Image circle diameter" stands for an effective imaging circular dimension of an image resolved by the imaging lens 10.

"F-number" stands for one kind of amount indicative of brightness of an optical system. The f-number of the imaging lens 10 is expressed in a value which is found by dividing an equivalent focal length of the imaging lens 10 by an entrance pupil diameter of the imaging lens 10. As shown in Table 2, the imaging lens 10 of the image sensing module 1 preferably has an f-number reduced to not more than 3. In this regard, (i) since an amount of light received by the imaging lens 10 is increased, it is possible to brighten an image and (ii) since a chromatic aberration is appropriately corrected, it is possible to obtain a high resolving power.

"Angle of view" stands for an angle within which the image sensing module 1 can carry out photography.

"Optical total length" stands for a total dimension, in the optical axis direction, of constituent elements of an optical system (i.e., the image sensing module 1) each of which constituent elements has a certain effect on an optical property of the optical system.

As shown in Table 2, the sensor 11 of the image sensing module 1 preferably has a pixel pitch ("sensor pixel pitch") of not more than 2.5 μm. By using the sensor 11 having a pixel pitch of not more than 2.5 μm, the image sensing module 1 can sufficiently utilize a performance of the image sensing element having a large number of pixels.

"Closest object distance" stands for a distance from the image sensing module 1 to an object which can be photographed by and is the closest to the image sensing module 1.

Figure 3:
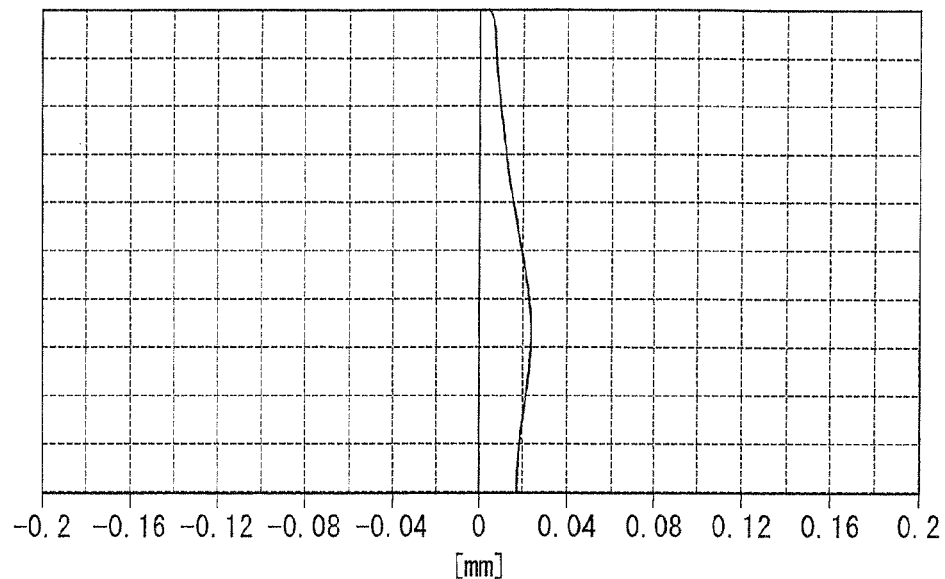
FIG. 3 (*a*) through (c) of FIG. 3 are graphs illustrating aberration properties of the imaging lens illustrated in FIG. 2, where (a) illustrates a spherical aberration property; (b) illustrates an astigmatism property; and (c) illustrates a distortion property.
Figure 3:
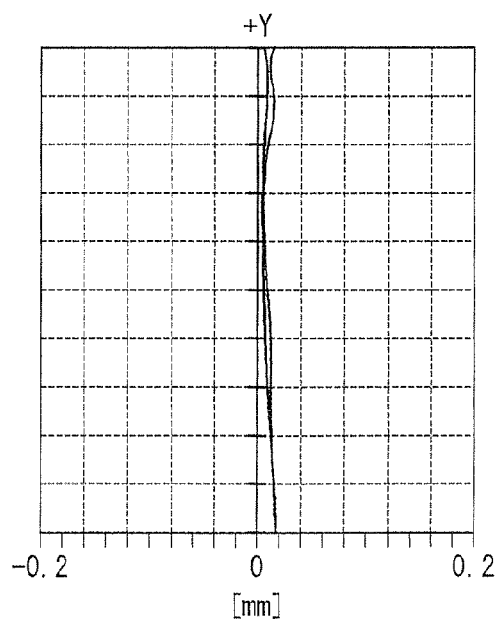
Figure 3:
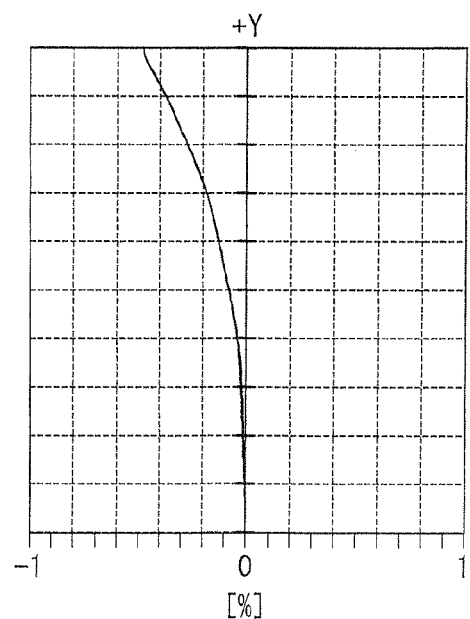

(a) through (c) of FIG. 3 are graphs illustrating respective aberration properties of the imaging lens 10 of FIG. 2. Specifically, (a) of FIG. 3 shows a spherical aberration property, (b) of FIG. 3 shows an astigmatism property, and (c) of FIG. 3 shows a distortion property.

The graphs show that each secondary aberration amount is small (i.e., a deviation of amount of each aberration is small which deviation occurs in response to an image displacement occurring in the direction normal to the optical axis). This proves that the imaging lens 10 is downsized, has a low height, and has a good optical property.

Figure 4:
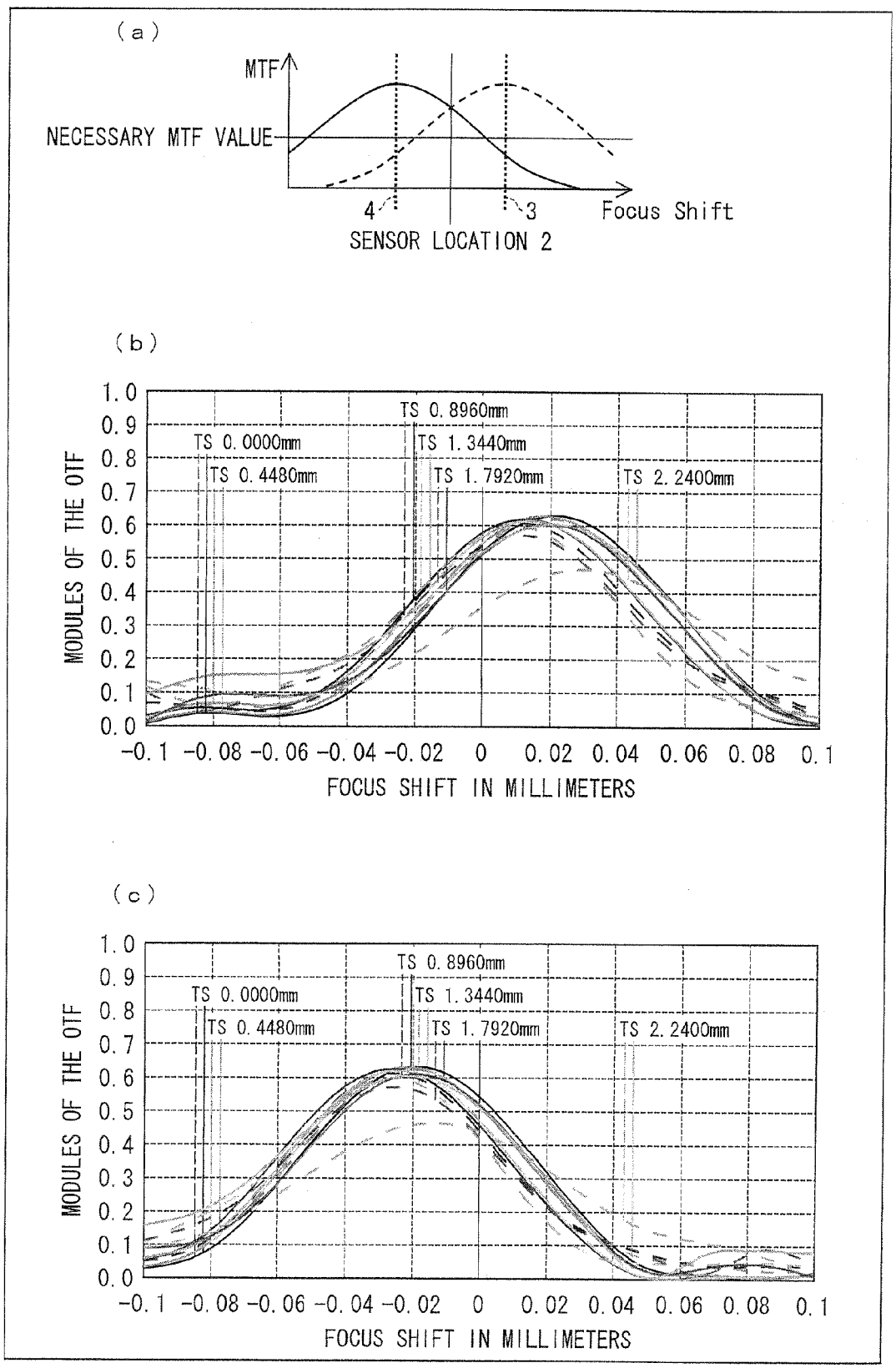
FIG. 4 (*a*) of FIG. 4 is a graph illustrating a relation between (i) defocus MTFs of the imaging lens with respect to respective white lights from a close object and a far object, and (ii) a location of an image sensing element; and (b) and (c) of FIG. 4 are graphs illustrating in detail the respective defocus MTFs illustrated in (a) of FIG. 4.

(a) of FIG. 4 is a graph illustrating a relation of (i) the sensor location 2, (ii) a defocus MTF (see (b) of FIG. 4 for detailed waveforms) of the imaging lens 10 with respect to white light from the sunflower 5 which is away from the sensor 11 by about 300 mm, and (iii) a defocus MTF (see (c) of FIG. 4 for detailed waveforms) of the imaging lens 10 with respect to white light from the tree 6 which is away from the sensor 11 by about 1500 mm.

A defocus MTF (modulation transfer function) is a value obtained by measuring how contrast of an image formed on the image surface S9 (see FIG. 2) changes in response to movement of the image surface S9 in the optical axis direction.

In a case where a spatial frequency was 71.4 lp/mm, (b) and (c) of FIG. 4 showed results of the respective defocus MTFs which were measured for respective image heights h0, h0.2, h0.4, h0.8, and h1.0.

Note that an image height stands for a height from a center of the image. An image height relative to a maximum image height is expressed in proportion. For example, an image height corresponding to a height which is 80% of the maximum image height from the center of the image is expressed as "image height h0.8" as above (alternatively, "image height eight tenths" or "h0.8"). The image heights h0, h0.2, h0.4, and h1.0 are expressed, which is similar to the image height h0.8.

The spatial frequency is set to 71.4 lp/mm for the following reasons. Namely, a spatial frequency for use in evaluation is selected in accordance with a target resolving performance. To find a defocus MTF, evaluations are carried out with respect to a depth of focus, astigmatism, and curvature of field of an optical system. On this account, it would reasonably appear that such evaluations are carried out not at a high spatial frequency corresponding to a critical resolving performance of a lens, but at a spatial frequency which is slightly lower than such a high spatial frequency. Further, one of indicators of a critical resolving performance of a sensor is a sensor Nyquist frequency. Evaluations are generally carried out at a spatial frequency which is half or quarter of the Nyquist frequency of the sensor. Therefore, according to the present embodiment, the spatial frequency is set to 71.4 lp/mm, which corresponds to quarter of the sensor Nyquist frequency. Note that in the present embodiment, the sensor pixel pitch is 1.75 μm, the sensor Nyquist frequency is 285.7143 lp/mm, and 71.42857≈71.4 lp/mm is quarter of this sensor Nyquist frequency 285.7143 lp/mm.

In (a) of FIG. 4 and later described FIGS. 5 through 7, a defocus MTF of the imaging lens 10 with respect to white light from the sunflower 5 is indicated by a dashed line, and a defocus MTF of the imaging lens 10 with respect to white light from the tree 6 is indicated by a solid line.

Each defocus MTF in (a) of FIG. 4 is shown by a mountainous curve in a graph in which a vertical axis represents the MTF value and a horizontal axis represents the focus shift. As a distance from the sensor 11 to the object becomes larger, the MTF value becomes local maximal in a region where a focus shift is small, i.e., on the left side in the graph on which side the image surface S9 is provided closer to the object.

The reason is as follows. Namely, the light from the sunflower 5 is guided along the optical axis of the imaging lens 10, and enters, in a form of bundle of rays, the imaging lens 10. On the other hand, the light from the tree 6 enters the imaging lens 10 in a form of a light ray which is substantially parallel to the optical axis of the imaging lens 10. As such, when the two light rays are converged by the imaging lens 10, the light from the tree 6 is converged closer to the imaging lens 10 (i.e., closer to the object) than the light from the sunflower 5.

Since the imaging lens 10 has a larger depth of field, a tangent to each curved line, shown in (a) of FIG. 4, indicative of the defocus MTF has a relatively gentle gradient as a whole. Therefore, the MTF value becomes good within a relatively wide range of focus shift.

Since the imaging lens 10 has a small curvature of field, the MTF value fluctuates small in response to a variation in image height.

The graph of (a) of FIG. 4 shows a local maximum value of the dotted curved line when the focus shift corresponds to the location 3 (see FIG. 1) of the best image surface of the imaging lens 10 which best image surface is obtained when the white light is received from the sunflower 5, whereas graph shows a local maximum value of the solid curved line when the focus shift corresponds to the location 4 (see FIG. 1) of the best image surface of the imaging lens 10 which best image surface is obtained when the white light is received from the tree 6.

"Necessary MTF value" shown in the graph of (a) of FIG. 4 stands for a resolving power which is enough to meet required specifications in the image sensing module 1.

As illustrated in FIG. 1, the sensor location 2 is between the location 3 and the location 4. In other words, the sensor location 2 corresponds to a location between (i) the local maximum value of the curved line indicated by the dotted line and (ii) the local maximum value of the curved line indicated by the solid line (see (a) of FIG. 4). In this case, both (i) an MTF value of the imaging lens 10 which is obtained in the sensor location 2 when the imaging lens 10 received the white light from the sunflower 5 and (ii) an MTF value of the imaging lens 10 which is obtained in the sensor location 2 when the imaging lens 10 received the white light from the tree 6 are greater than or equal to the necessary MTF value.

The image sensing module 1 hence has the resolving power which is enough to meet the required specifications for both photographing the sunflower 5 which is located close and photographing the tree 6 which is located far.

Further, it is possible that the image sensing module 1 has stable and high resolving power for both (i) photographing the sunflower 5 which is close to the imaging lens 10 and (ii) photographing the tree 6 which is far from the imaging lens 10, by causing the sensor location 2 to be located so as to correspond to an intersection of the defocus MTF indicated by the dotted line and the defocus MTF indicated by the solid line (see (a) of FIG. 4).

Figure 5:
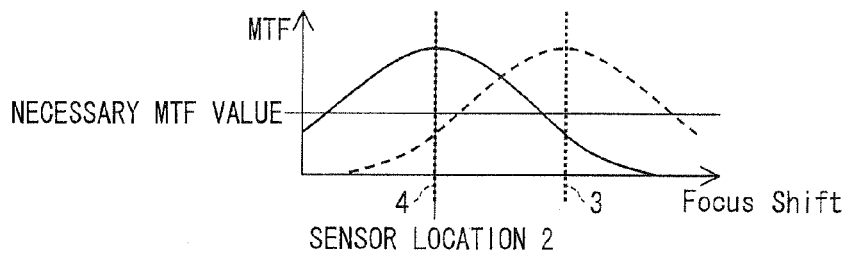
FIG. 5

Unlike the graph shown in (a) of FIG. 4, FIG. 5 shows a case in which the sensor location 2 is located so as to be coincident with the location corresponding to the local maximum value indicated by the solid curved line, i.e., the location 4 of the best image surface of the imaging lens 10 obtained when the imaging lens 10 receives the white light from the tree 6.

In this case, an MTF value, which is obtained in the sensor location 2 when the imaging lens 10 receives the white light from the sunflower 5, is less than the necessary MTF value. Therefore, the sunflower 5 photographed by the image sensing module 1 will blur.

Figure 6:
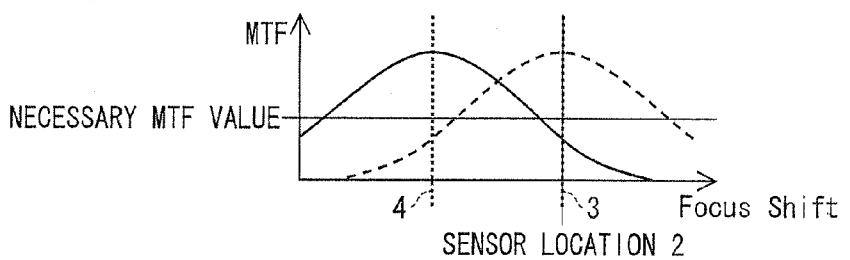
FIG. 6

Unlike the graph shown in (a) of FIG. 4, FIG. 6 shows a case in which the sensor location 2 is located so as to be coincident with the location corresponding to the local maximum value indicated by the dotted curved line, i.e., the location 3 of the best image surface of the imaging lens 10 obtained when the imaging lens 10 receives the white light from the sunflower 5.

In this case, an MTF, which is obtained in the sensor location 2 when the imaging lens 10 receives the white light from the tree 6, is less than the necessary MTF value. Therefore, the tree 6 photographed by the image sensing module 1 will blur.

Figure 7:
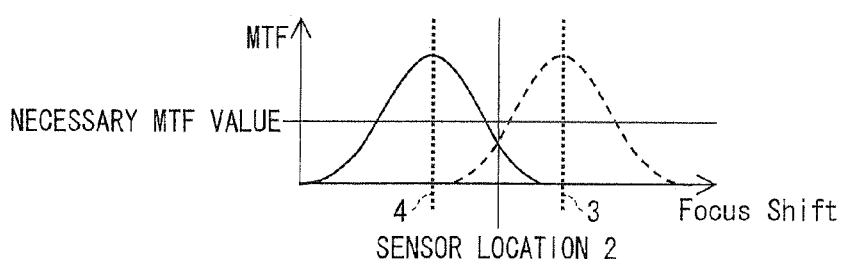
FIG. 7

Unlike the graph shown in (a) of FIG. 4, FIG. 7 shows a case in which the imaging lens 10 has a small depth of field.

In this case, the gradient of a tangent to each curved line indicative of the defocus MTF is steep as a whole. This causes the focus shift to have a narrowly limited range within which a good MTF value is obtained. It follows that even if the sensor location 2 is located so as to correspond to an intersection of the defocus MTF indicated by the dotted line and the defocus MTF indicated by the solid line, the MTF values which are obtained in the sensor location 2 when the imaging lens 10 receives the respective white lights from the sunflower 5 and the tree 6 will both be less than the necessary MTF value. Both the sunflower 5 and tree 6 photographed by the image sensing module 1 will therefore be blur.

Figure 8:
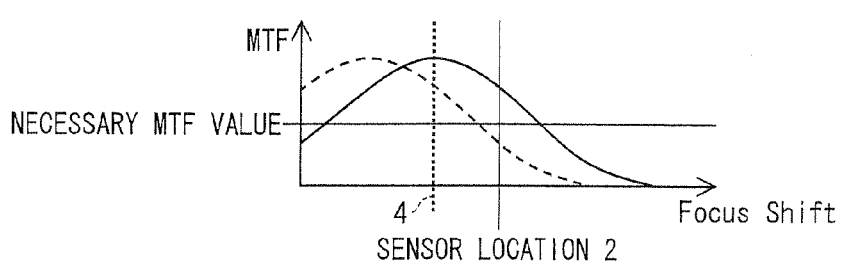
FIG. 8

FIG. 8 is a graph illustrating a relation of (i) the sensor location 2 and (ii) defocus MTFs for the respective image heights h0 and h0.8 which defocus MTFs are obtained by the imaging lens 10 from the white light received from the tree 6. Note that the graph of FIG. 8 indicates that the imaging lens 10 has a curvature of field.

In FIG. 8, a defocus MTF of the imaging lens 10 measured for the image height h0 is indicated by a solid line, and a defocus MTF of the imaging lens 10 measured for the image height h0.8 is indicated by a dotted line.

The defocus MTFs, shown in FIG. 8, measured for the respective image heights h0 and h0.8 are greatly different from each other due to a curvature of field. In FIG. 8, which shows that the sensor location 2 is identical to that of (a) of FIG. 4, an MTF value of the imaging lens 10, which is measured for the image height h0.8 and is obtained in the sensor location 2 when the imaging lens 10 receives from the white light received from the tree 6, is less than the necessary MTF value. In this case, the tree 6 photographed by the image sensing module 1 will be sharp at its central portion, but blurs on its periphery.

Figure 9:
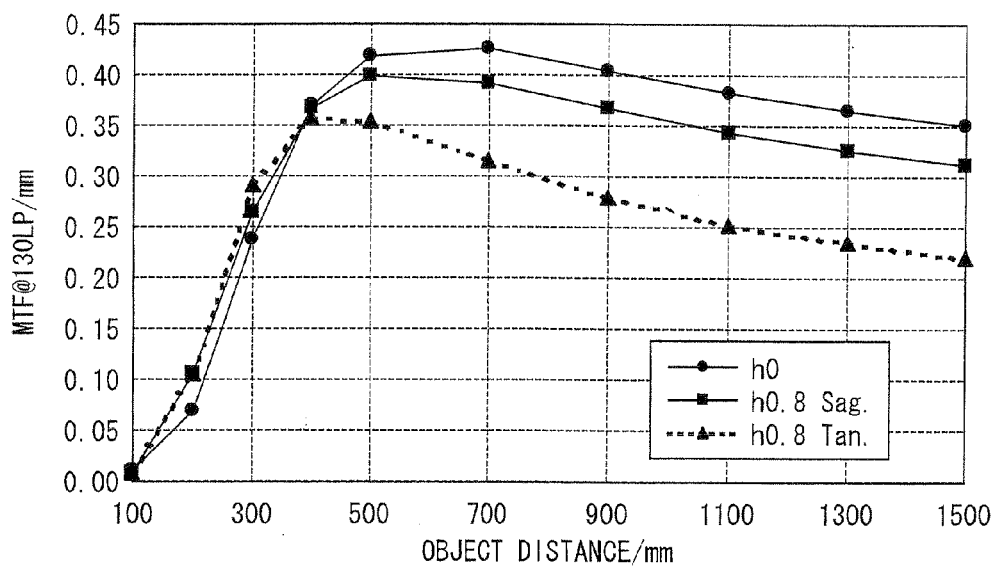
FIG. 9

FIG. 9 is a graph illustrating how the MTF value changes in accordance with the object distance, i.e., a distance from the sensor 11 to an object. Specifically, FIG. 9 is a graph illustrating a relation between the object distance and the MTF values (at a spatial frequency of 130 lp/mm) both shown in Table 3. In the graph, a vertical axis represents the MTF value and a horizontal axis represents the object distance. The spatial frequency of 130 lp/mm is equivalent to about 700 TV lines.

TABLE 3

| Object distance | MTF@130 lp/mm | | |
|---|---|---|---|
| | h0 | h0.8 | |
| | — | Sag | Tan |
| 100 | 0.01 | 0.01 | 0.01 |
| 200 | 0.07 | 0.11 | 0.11 |
| 300 | 0.24 | 0.27 | 0.29 |
| 400 | 0.37 | 0.37 | 0.36 |
| 500 | 0.42 | 0.40 | 0.36 |
| 700 | 0.43 | 0.39 | 0.32 |
| 900 | 0.40 | 0.37 | 0.28 |
| 1100 | 0.38 | 0.34 | 0.25 |
| 1300 | 0.36 | 0.32 | 0.23 |
| 1500 | 0.35 | 0.31 | 0.22 |
| Maximum difference | 0.19 | 0.13 | 0.14 |

"Maximum difference" stands for a difference between a maximum MTF value and a minimum MTF value within a range from 300 mm to 1500 mm in object distance.

"Sag" and "Tan" indicate a sagittal image surface and a tangential image surface, respectively. A sagittal image surface stands for a locus of image points which are formed by, among light rays which are incident on an optical system from an object point which is not on an optical axis of the optical system, light rays (sagittal rays) of a rotational symmetric optical system a plane (sagittal plane) perpendicular to a plane in which a chief ray and an optical axis are included. A tangential image surface stands for an image surface formed by a luminous flux (meridional rays) which are orthogonal to a bundle of sagittal rays and which include a chief ray. Both the "sagittal image surface" and the "tangential image surface" are general optical terms, and therefore a further detailed explanation of these terms is omitted.

According to the image sensing module 1, a high MTF value of not less than 0.20 is obtained for each of the image heights h0, h0.8 (sagittal image surface), and h0.8 (tangential image surface), in a range of object distance from about 300 mm to 1500 mm or larger (almost to infinity) (see the graph of FIG. 9). The graph therefore indicates that the image sensing module 1 has a good resolving power in a wide range of object distance.

As is clear from the above description, even in a case where an image sensing module 1 employs an arrangement in which the imaging lens 10 is a fixed focus lens whose location and focal position are both fixed, it is possible to obtain a resolving power which is enough to meet required specifications for both photographing the sunflower 5 and photographing the tree 6.

It follows that the image sensing module 1 requires no mechanism for changing the location and focal position of the imaging lens 10 in accordance with a location of an object. As such, the image sensing module 1 can have a simplified structure.

According to the present invention, adjustments are made to aberrations occurring in the optical axis direction, and a depth of focus is designed to be large. According to the present invention, aberration correction in which a correction for a curvature of field is particularly focused on is carried out so that an MTF-defocus characteristic is constant regardless of an image height. Further, according to the present invention, the lens-sensor positional adjustment is carried out so that the sensor has a surface provided between (i) a location of the best image surface of an object which is close to the lens and (ii) a location of the best image surface of an object which is far from the lens.

To describe functions and effects of the present invention more clearly, the following description briefly deals with similar evaluations which were carried out with respect to an image sensing module of a comparative example.

The image sensing module of the comparative example includes an imaging lens whose depth of field is not increased and whose curvature of field has not been subjected to addition of any specific feature. The image sensing module of the comparative example merely has an improved resolving power in a location where an image is just focused.

Figure 10:
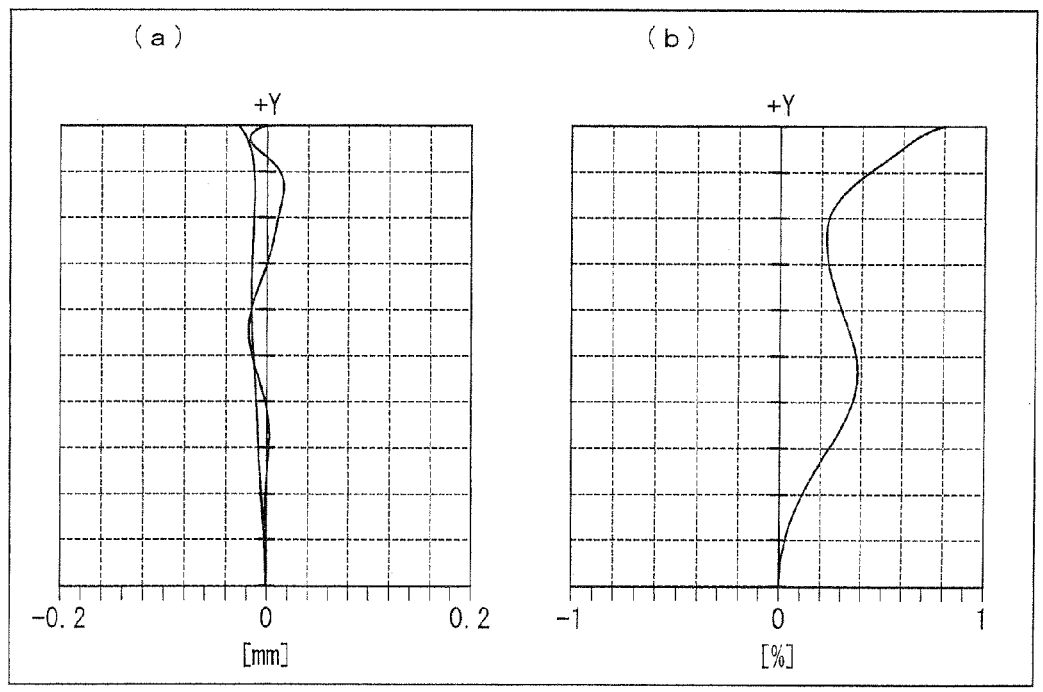
FIGS. 10 (a) and (b) of FIG. 10 are graphs illustrating aberration properties of an imaging lens of an image sensing module according to a comparative example for the image sensing module illustrated in FIG. 1, where (a) illustrates an astigmatism property; and (b) illustrates a distortion property.

The image sensing module of the comparative example has aberration properties shown in respective graphs of (a) and (b) of FIG. 10. (a) of FIG. 10 shows an astigmatism property, and (b) of FIG. 10 shows a distortion property. (b) of FIG. 10 clearly shows that the image sensing module of the comparative example has a distortion larger than the distortion (see (c) of FIG. 3) of the image sensing module 1.

Figure 11:
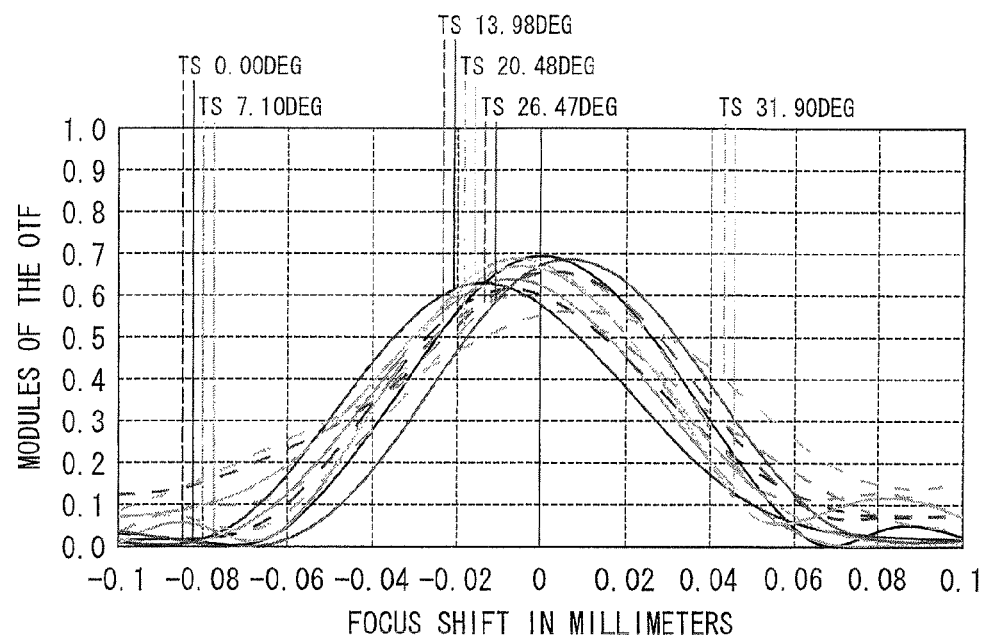
FIG. 11

The image sensing module of the comparative example has a sensor location which substantially corresponds to the location 4 in FIG. 1, i.e., to the location of the best image surface of the imaging lens which is obtained when the imaging lens receives the white light from the object which is far from the sensor by a distance of 1500 mm (see FIG. 11). In a case where a spatial frequency is 71.4 lp/mm, the graph of FIG. 11 showed results of defocus MTFs which were measured for the respective image heights h0, h0.2, h0.4, h0.8, and h1.0.

Figure 12:
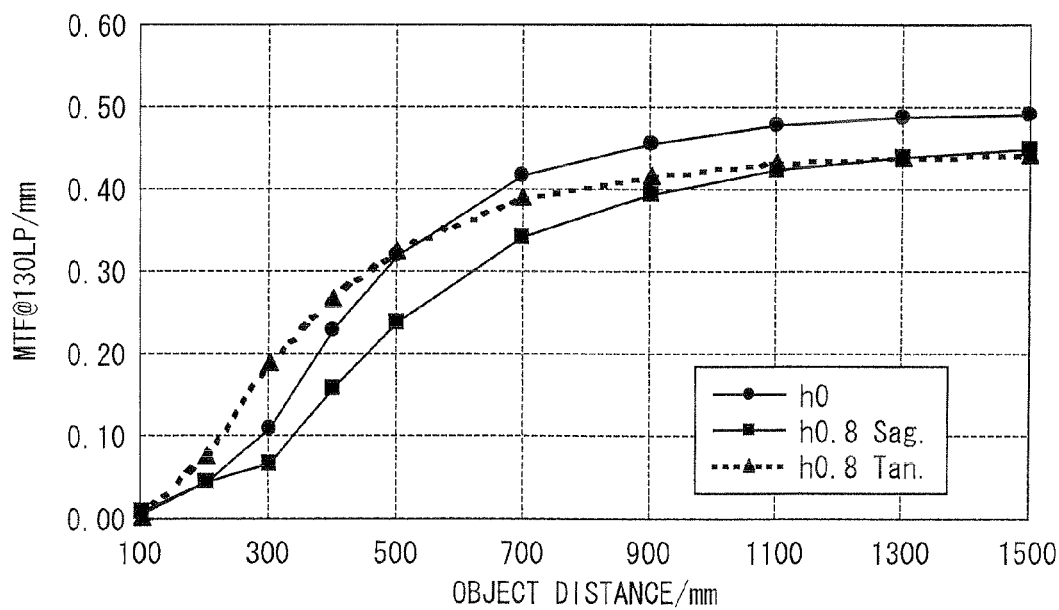
FIG. 12

FIG. 12 is a graph showing how an MTF value changes in response to an object distance, i.e., a distance from a sensor of the image sensing module of the comparative example to an object. The graph of FIG. 12 shows a relation of the MTF value and object distance both shown in Table 4 (spatial frequency: 130 lp/mm). In the graph, a vertical axis represents the MTF value and a horizontal axis represents the object distance.

TABLE 4

| | MTF@130 lp/mm | | |
|---|---|---|---|
| Object | h0 | h0.8 | |
| distance | — | Sag | Tan |
| 100 | 0.01 | 0.01 | 0.00 |
| 200 | 0.05 | 0.05 | 0.08 |
| 300 | 0.11 | 0.07 | 0.19 |
| 400 | 0.23 | 0.16 | 0.27 |
| 500 | 0.32 | 0.24 | 0.33 |
| 700 | 0.41 | 0.34 | 0.39 |
| 900 | 0.46 | 0.39 | 0.42 |
| 1100 | 0.48 | 0.42 | 0.43 |
| 1300 | 0.49 | 0.44 | 0.44 |
| 1500 | 0.49 | 0.45 | 0.44 |
| Maximum difference | 0.38 | 0.38 | 0.25 |

According to the graph of FIG. 12, the image sensing module of the comparative example has a low MTF value of less than 0.20 is obtained for each of the image heights h0, h0.8 (sagittal image surface), and h0.8 (tangential image surface), when an object distance is about 300 mm. This will cause a low resolving power. As to the image height h0.8 (sagittal image surface) in particular, the MTF value does not reach 0.20 until the object distance is increased to about 450 mm. It is hence only within a narrow range of object distance that this image sensing module has a great resolving power.

In a case of normal photographing (simple photographing of an object), the sensor 11 needs to supply information on all pixels which is obtained from white light made up of respective monochromatic radiations of "red (700.0 nm)", "green (546.1 nm)", and "blue (435.8 nm)" in an RGB color model.

By contrast, in a case where a so-called two-dimensional matrix code such as a QR code (registered trademark) is read, the sensor 11 merely needs to supply information on pixels which is obtained by the "green" monochromatic radiation. This allows a code reading process to be more easily carried out based on information on pixels which is obtained from the "green" monochromatic radiation (see FIG. 14). The code reading process is later described in detail.

Figure 14:
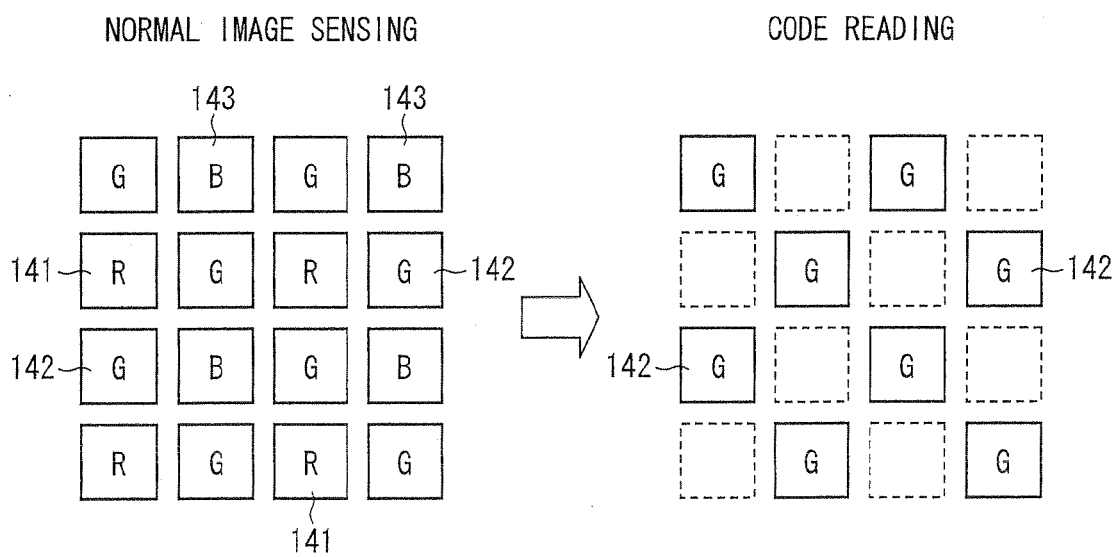
FIG. 14

In FIG. 14, R141 indicates a pixel on which information is obtained from a "red" monochromatic radiation; G142 indicates a pixel on which information is obtained from a "green" monochromatic radiation; and B143 indicates a pixel on which information is obtained from a "blue" monochromatic radiation. In the sensor 11, a total number of pixels G142 is normally twice as large as each of a total number of pixels R141 and a total number of pixels B143. Only the pixels G142 are used to read a two-dimensional matrix code.

In other words, the sensor 11 is capable of supplying only information on the pixels G142 out of information on the pixels R141, information on the pixels G142, and information on the pixels B143.

Note that only the information on the pixels G142 can be supplied from the sensor 11, for example, by the following method. Namely, only an output circuit (not shown) for supplying information on the pixels G142 from the sensor 11 is placed into operation, whereas output circuits (not shown) for supplying information on the pixels R141 and B143 from the sensor 11 are not placed into operation. The controlling of whether or not each of the three output circuits is placed into operation is carried out in accordance with a binary stop signal. The binary stop signal, a high level or a low level, is generated by a known signal generating circuit (not shown) provided inside or outside the sensor 11. Each of the three output circuits is arranged, for example, to (i) be placed into operation in response to a high-level stop signal supplied to its stop signal input terminal (not shown) and (ii) not be placed into operation in response to a low-level stop signal supplied to the stop signal input terminal. A high-level stop signal is supplied to the stop signal input terminal of each of the three output circuits in the case of normal photographing (see FIG. 14). By contrast, in the case where a two-dimensional matrix code is read (see FIG. 14), a high-level stop signal is supplied to the stop signal input terminal of the output circuit for the pixels G142, whereas a low-level stop signal is supplied to the stop signal input terminal of each of the output circuits for the pixels R141 and B143.

The above method is, however, merely an example method for supplying only information on the pixels G142 from the sensor 11. The method for supplying only information on the pixels G142 from the sensor 11 is not limited to a specific one, provided that it is possible to stop the supplying of information on the pixels R141 and information on the pixels B143 in a normal sensor 11. Any known arrangement is applicable which allows a switch, for each color of pixels of the sensor 11, between a state in which information is supplied and a state in which no information is supplied.

Figure 13:
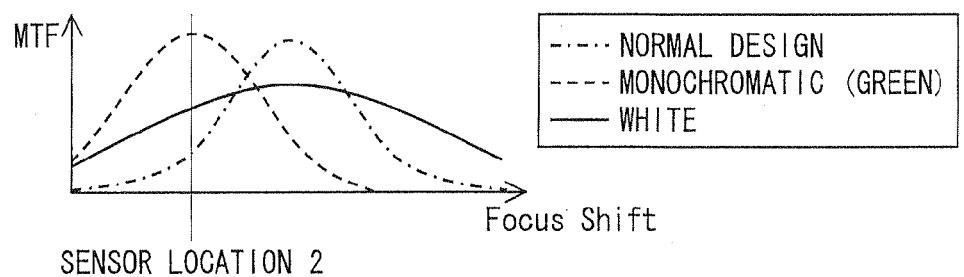
FIG. 13

In the image sensing module 1, the sensor location 2 preferably coincides with a location of a best image surface of the imaging lens 10 which is obtained when the imaging lens 10 receives the "green" monochromatic radiation from an object close to the image sensing module 1, i.e., an object away from the sensor 11 by about 300 mm (see FIG. 13). With the arrangement, an image formed, by the imaging lens 10, based on the "green" monochromatic radiation which is received from the object close to the image sensing module 1 becomes the sharpest in the sensor location 2. This allows the sensor 11 to recognize a fine two-dimensional matrix code. As such, it is possible to read a finer two-dimensional matrix code.

Figure 15:
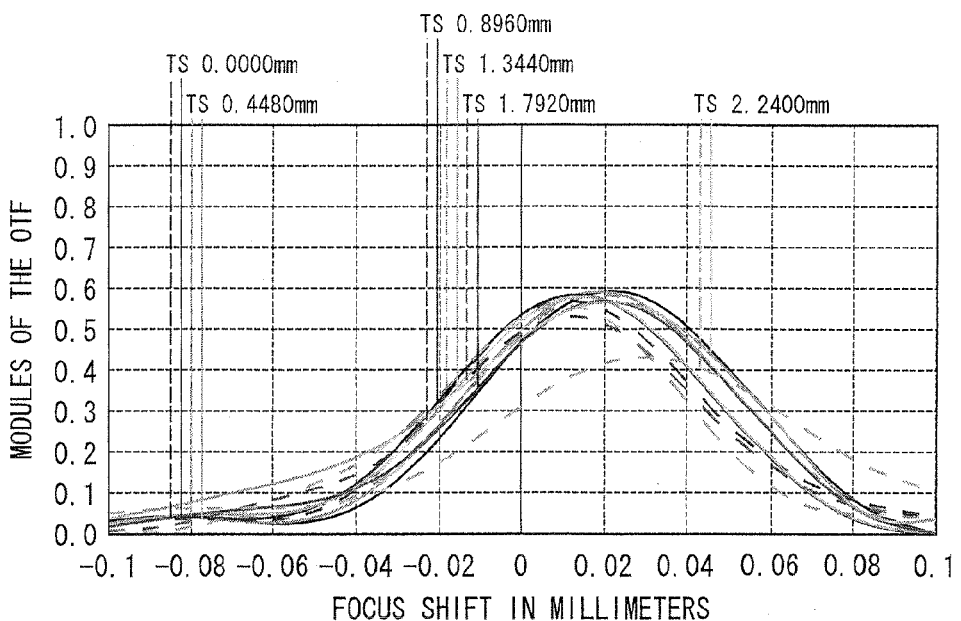
FIG. 15 (a) of FIG. 15 is a graph illustrating in detail the defocus MTF of the imaging lens, illustrated in FIG. 13, of the present invention with respect to white light from a close object; and (b) of FIG. 15 is a graph illustrating in detail the defocus MTF of the same imaging lens with respect to a green monochromatic radiation from a close object.
Figure 15:
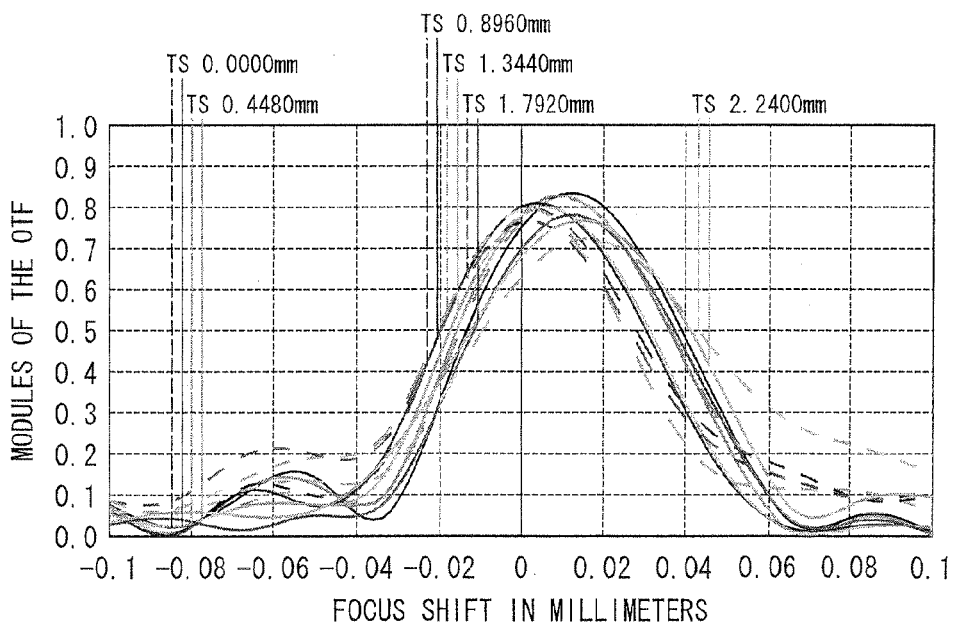

FIG. 13 further shows a defocus MTF which was obtained when the imaging lens in the image sensing module of the comparative example received white light. (a) of FIG. 15 shows in detail the defocus MTF of the imaging lens 10 used in FIG. 13 with respect to the white light from a close object. (b) of FIG. 15 shows in detail a defocus MTF of the imaging lens 10 which was obtained when the defocus MTF of the imaging lens 10 receives a green monochromatic radiation from the object close to the image sensing module 1.

The following description deals with a code reading process which is carried out based on information on pixels which is obtained from the "green" monochromatic radiation.

Whether it is possible to read a two-dimensional matrix code depends on a resolving performance (resolving power) of the sensor 11 or a resolving performance of the imaging lens 10.

Specifically, even if the sensor 11 has a sufficient resolving performance necessary for reading a two-dimensional matrix code, the image sensing module 1 will not be able to read the two-dimensional matrix code if the imaging lens 10 lacks a resolving performance necessary for such a reading.

Similarly, even if the imaging lens 10 has a sufficient resolving performance necessary for reading a two-dimensional matrix code, the image sensing module 1 will not be able to read the two-dimensional matrix code if the sensor 11 lacks a resolving performance necessary for such a reading.

Hence, a size of a readable two-dimensional matrix code is limited by a critical resolving performance of the imaging lens 10 or a critical resolving performance of the sensor 11, whichever is lower.

The critical resolving performance is an indicator for a measure of performance of how small an image a lens or a sensor can resolve.

First, the respective critical resolving performances of the imaging lens 10 and the sensor 11 are found and compared.

Figure 16:
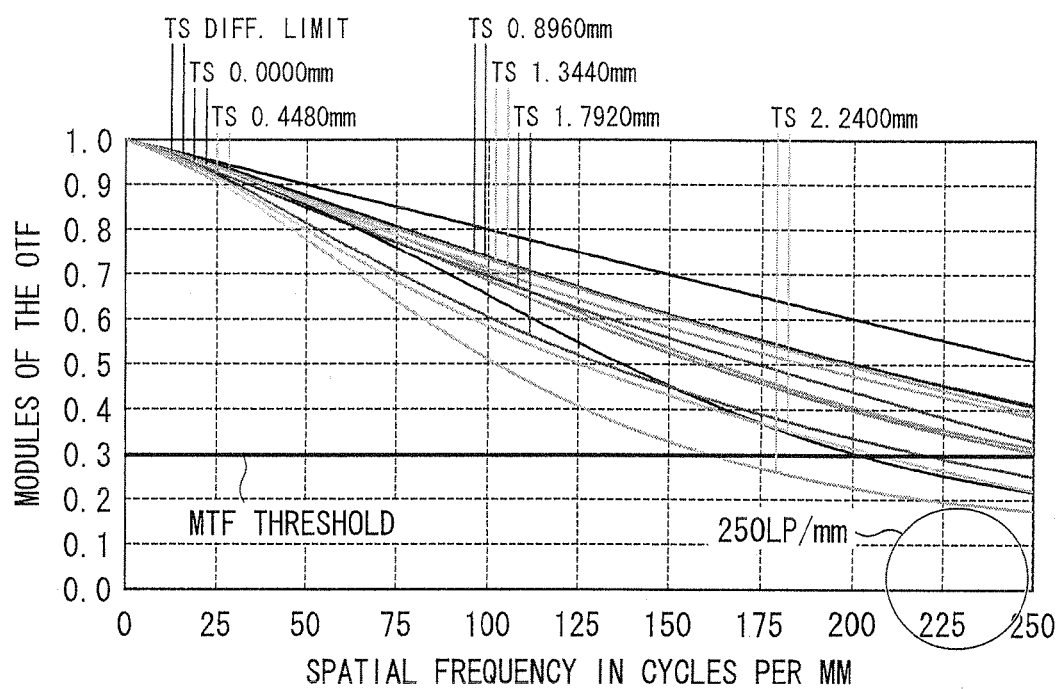
FIG. 16

A resolvable MTF threshold (minimum MTF value) is set to 2.0 on the basis of, among design data for the imaging lens 10, the MTF and spatial frequency characteristic of the imaging lens 10 which were obtained when the imaging lens 10 receives the "green" monochromatic radiation. In this case, the imaging lens 10 has a critical resolving performance of 250 lp/mm (see FIG. 16).

Assuming that the critical resolving performance of the sensor 11 is a Nyquist frequency found from a pitch p of pixels of the sensor 11, the Nyquist frequency of the sensor 11 is expressed as follows:

1/(p×2).

Since the sensor 11 supplies only information on pixels G142 (see FIG. 14), a pitch p' of the pixels G142 is expressed by the following equation:

p'=p×√2.

The sensor 11 therefore has the following Nyquist frequency:

1/(2×p×√2).

Figure 17:
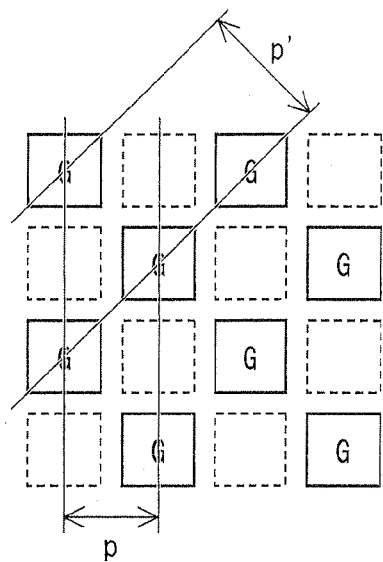
FIG. 17
Figure 18:
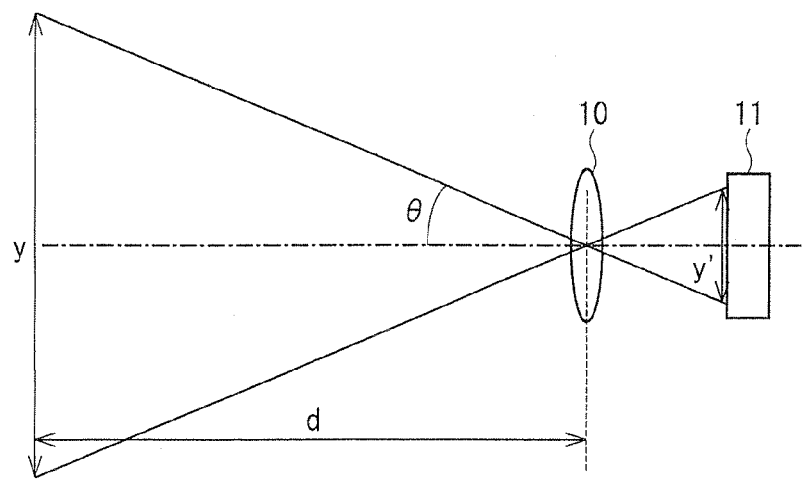
FIG. 18

The sensor 11 of the present embodiment has a pixel pitch p of 1.75 µm and thus has a critical resolving performance of 202 lp/mm (see FIG. 17).

Thus, the imaging lens 10 has a critical resolving performance of 250 lp/mm, and the sensor 11 has a critical resolving performance of 202 lp/mm. Therefore, it is the resolving performance of the sensor 11 that determines the size of a code which can be read by the image sensing module 1.

Next, an object size is found which corresponds to a readable resolving performance.

It is possible to find a size of a resolvable object on the basis of (i) a distance from the imaging lens 10 to an object and (ii) an angle of view of the image sensing module 1. Then, on the basis of (i) the size of the resolvable object and (ii) an image circle diameter of the sensor 11, it is possible to find a magnification of the imaging lens 10 (i.e., a magnification, with respect to an object, of an image formed by the imaging lens). Specifically, the magnification of the imaging lens 10 can be found from the following Formulae (2) and (3):

$$y = 2 \times d \times \tan\theta \quad (2)$$

$$M = y'/y \quad (3)$$

In the Formulae (2) and (3), d is a distance from the imaging lens 10 to an object, θ is a half angle of view (angle of view/2), y is a size of the object to be resolved at the distance d, y" is an image circle diameter, and M is a magnification of the imaging lens 10.

Further, on the basis of (i) the magnification M of the imaging lens 10 and (ii) a critical resolving performance of the image sensing module 1, it is possible to find a size of a readable code. Specifically, the size of the readable code can be found from the following Formulae (4) through (7):

$$x' = \frac{1}{x \times M} \times \frac{1}{2} \quad (4)$$

$$x' = \frac{1}{x \times \frac{y'}{y}} \times \frac{1}{2} \quad (5)$$

$$x' = \frac{1}{x \times \frac{y'}{2 \times d \times \tan\theta}} \times \frac{1}{2} \quad (6)$$

$$x = \frac{1}{x' \times \frac{y'}{2 \times d \times \tan\theta}} \times \frac{1}{2} \quad (7)$$

In the Formulae (4) through (7), x is a size of a readable two-dimensional matrix code; and x' is a critical resolving performance of the image sensing module 1.

It is possible to find the size x of a readable two-dimensional matrix code, by substituting, in Formulae (4) through (7), values (see Table 5 below) of (i) the distance d from the imaging lens 10 to the object, (ii) the half angle of view θ, (iii) the image circle diameter y', and (iv) the critical resolving performance x' of the image sensing module 1.

TABLE 5

| | |
|---|---|
| d/mm | 300 |
| θ/deg | 30 |
| y'/mm | 4.48 |
| x'/lp/mm | 202 |

Note that, in the present embodiment, the critical resolving performance x' of the image sensing module 1 is equal to the critical resolving performance of the sensor 11.

According to the Formulae (2) through (7), the size x of a readable two-dimensional matrix code is 0.19 mm. It follows that the image sensing module 1 can read a two-dimensional matrix code having a size of 0.19 mm.

Figure 19:
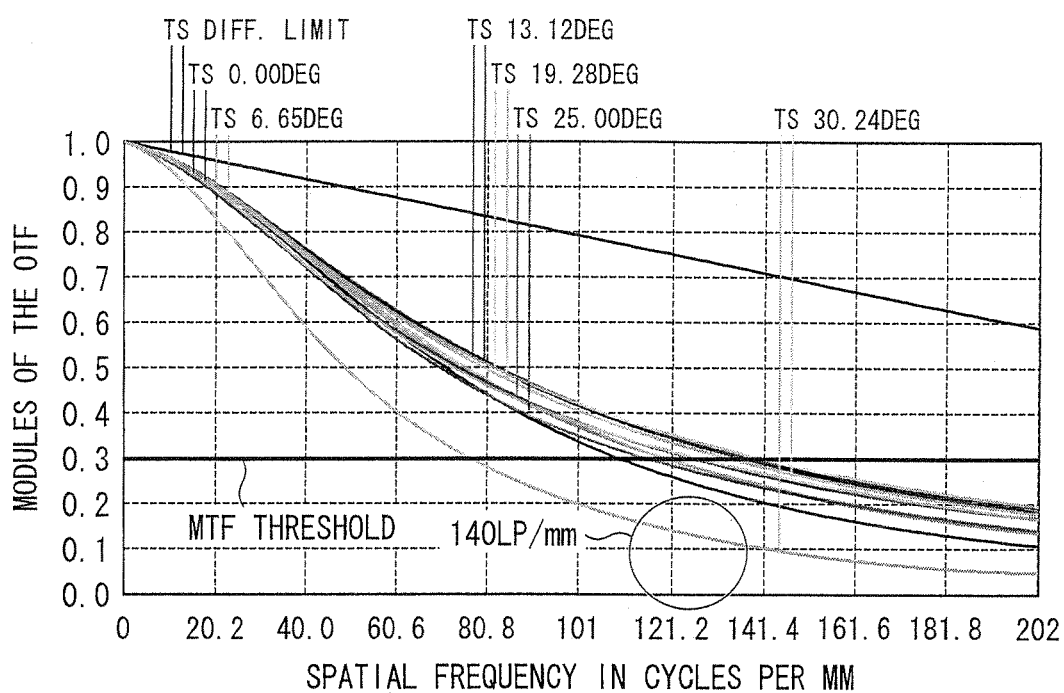
FIG. 19

Note that without the use of the method of the present embodiment for achieving high-resolution during the code reading, the imaging lens 10 will have a critical resolving performance of about 140 lp/mm. According to Formulae (2) through (7), the size x of a readable two-dimensional matrix code in this case will be about 0.28 mm (see FIG. 19 and Table 6

TABLE 6

| | |
|---|---|
| d/mm | 300 |
| θ/deg | 30 |
| y'/mm | 4.48 |
| x'/lp/mm | 140 |

In the image sensing module 1, the imaging lens 10 is preferably mounted on the sensor 11 via a cover glass CG for protecting the sensor 11.

With the arrangement, it is possible that a case (housing) for containing the imaging lens 10 is omitted from the image sensing module 1. By thus omitting such a case, the image sensing module 1 can be downsized, and low in height and cost.

Figure 20:
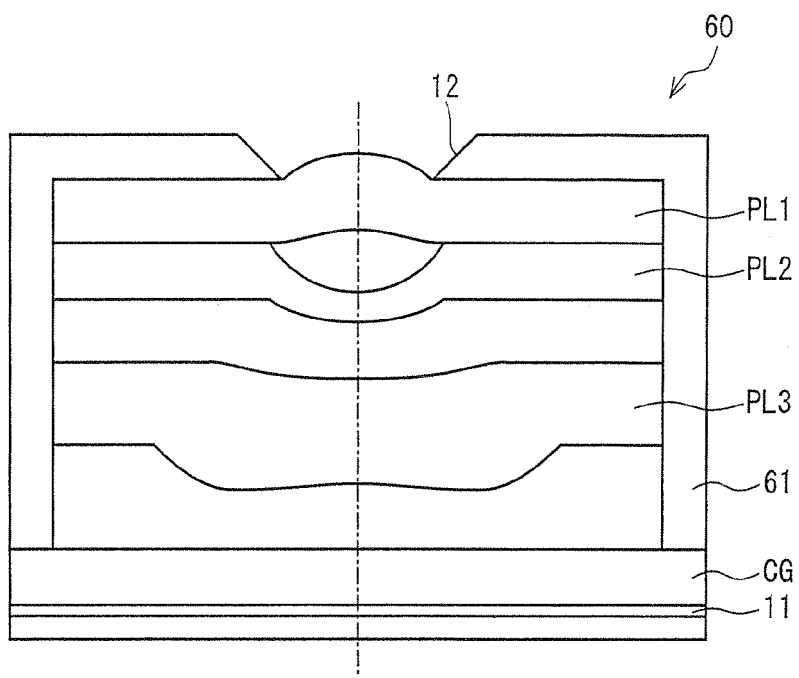
FIG. 20

FIG. 20 illustrates an image sensing module 60, which is an example of a detailed structure of the image sensing module 1 (see FIG. 1). The image sensing module 60 includes a first lens PL1, a second lens PL2, a third lens PL3, a cover glass CG, a housing 61, and a sensor 11. The image sensing module 60 further includes an aperture stop 12 which is formed integral with the housing 61. Specifically, the aperture stop 12 is a part of the housing 61, and partially covers an upper surface (corresponding to the surface S1 in FIG. 2) of the first lens PL1 so that a convexity which is part of the upper surface is exposed in the aperture stop 12. The image sensing module 60 can thus be construed as including the imaging lens 10 (see FIGS. 1 and 2), the sensor 11 (see FIG. 1), and the housing 61.

The housing 61 is a case in which the imaging lens 10 is contained, and is made of a light-blocking member.

Since the sensor 11 is constituted with the use of a solid-state image sensing device, the image sensing module 60 can be downsized and low in height. In particular, in a case where the sensor 11 is constituted with the use of a solid-state image sensing device in an image sensing module 60 which is mounted in a personal digital assistance (not shown) such as an information personal digital assistant and a mobile telephone, it is possible to provide an image sensing module which has a high resolving power and which is downsized and low in height.

The image sensing module 60 serves as the image sensing module 1, which has a resolving power enough to meet required specifications for both photographing a close object and photographing a far object. Thus, although the image sensing module 60 includes neither an adjustment mechanism (not shown) for adjusting a distance between the imaging lens 10 and the sensor 11 nor a lens barrel (not shown), the resolving power is maintained without being adversely affected to a large extent (see FIGS. 1 and 2). By thus omitting the adjustment mechanism and the lens barrel, the image sensing module 60 can be further downsized, low in height and cost.

The image sensing module 60, which has a resolving power enough to meet required specifications for both photographing a close object and photographing a far object. As such, it is possible to arrange the image sensing module 60 as an image sensing module having a simplified arrangement in which no adjustment mechanism for adjusting a distance between a lens and a sensor is provided.

Figure 21:
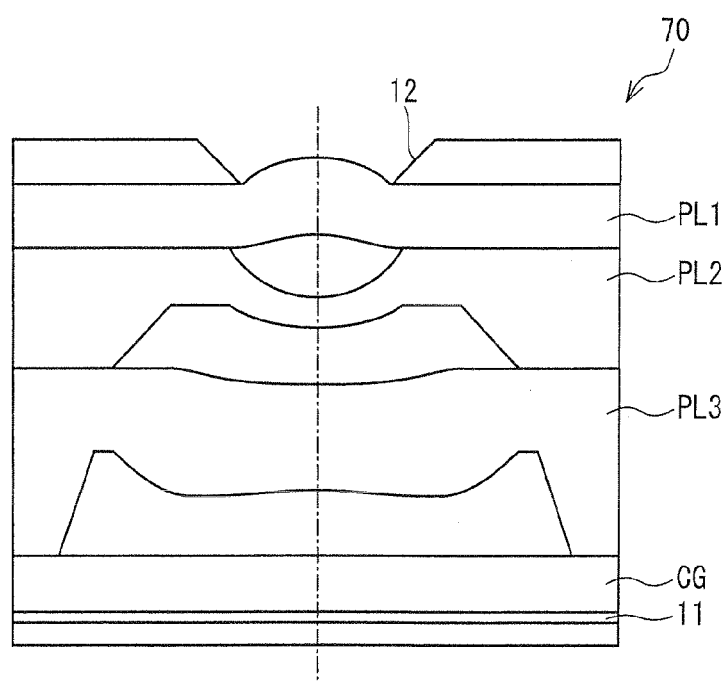
FIG. 21

FIG. 21 illustrates an image sensing module 70. The image sensing module 70 does not include a housing 61 which the image sensing module 60 illustrated in FIG. 20 includes. It follows that the image sensing module 70 includes an aperture stop 12 which is provided in the same manner as the imaging lens 10 illustrated in FIG. 2.

Further, unlike the image sensing module 60 illustrated in FIG. 20, the image sensing module 70 illustrated in FIG. 21 has a third lens PL3 so that a peripheral part of a lower end surface (corresponding to the surface S6 in FIG. 2) of the third lens PL3, i.e., an edge portion of the third lens PL3 is mounted on the sensor 11 via the cover glass CG.

A housing 61, which is a case for containing the imaging lens 10 (see FIGS. 1 and 2), can be omitted from the image sensing module 70. By thus omitting such a housing 61, the image sensing module 70 can be further downsized, low in height and cost.

The image sensing module 70 is structured on the basis of the image sensing module 60, which includes neither an adjustment mechanism (not shown) nor a lens barrel (not shown). In addition, the imaging lens 10 of the image sensing module 70 includes a third lens PL3 whose lower end surface S6 is away from the cover glass CG by an extremely small distance. Specifically, according to the image sensing module 70, a part, via which the third lens PL3 is mounted on the cover glass CG, is provided in a region where a deviation ratio of thickness of the lens is small, in the third lens PL3. This gives rise to a provision of the image sensing module 70 which has a simplified structure which requires no housing 61.

Except for the above point, the image sensing module 70 is identical to the image sensing module 60.

Figure 22:
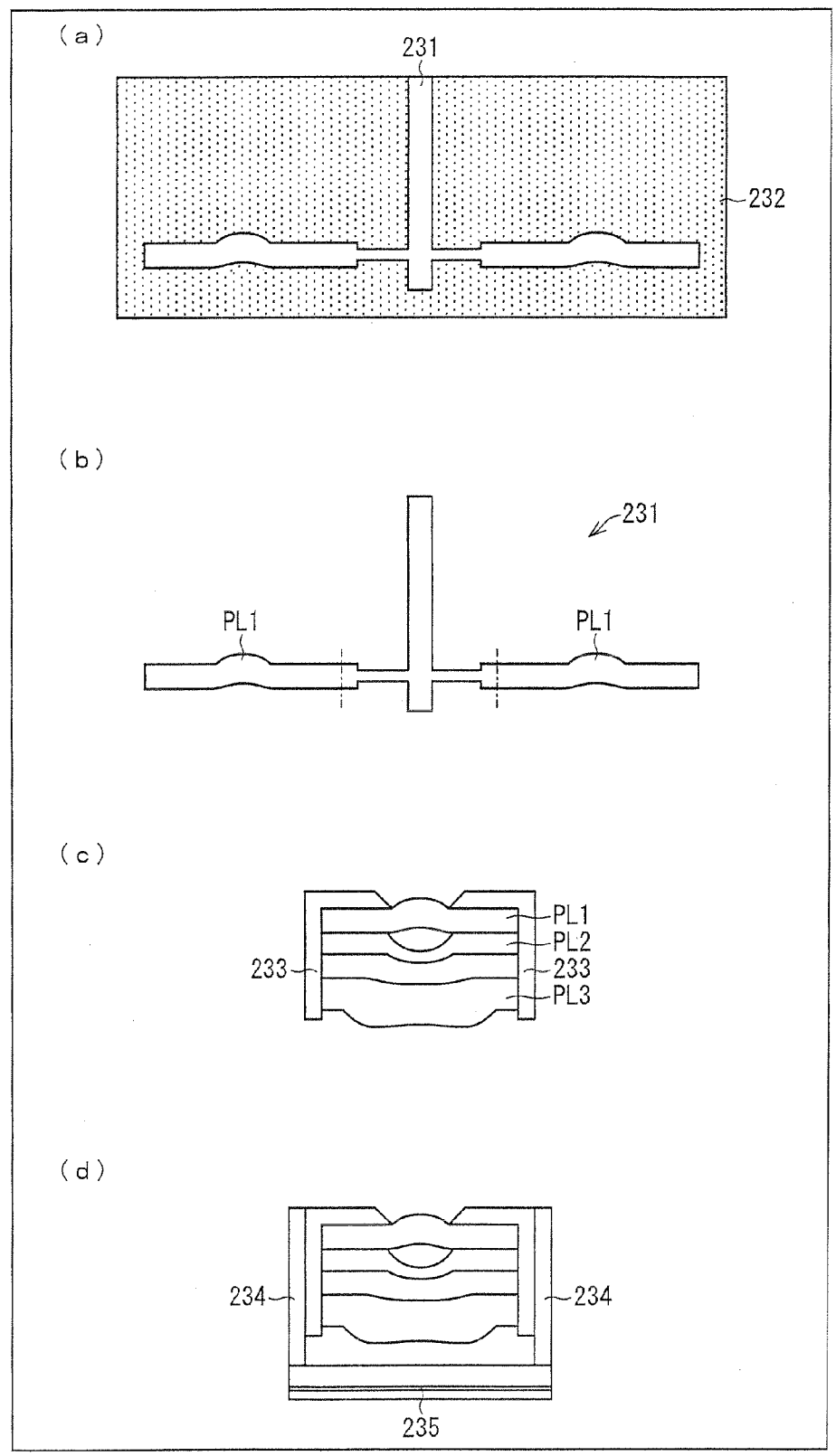
FIG. 22

With reference to (a) through (d) of FIG. 22, the following description outlines a general method for producing an image sensing module.

The first lens PL1, the second lens PL2, and the third lens PL3 are each prepared by injection molding with the main use of a thermoplastic resin 231. In this injection molding which is carried out with the use of the thermoplastic resin 231, the thermoplastic resin 231 is heated so as to be softened, and is then pushed into the mold 232 under a predetermined injection pressure (about 10 to 3000 kgf/c) so that the mold 232 is filled with the thermoplastic resin 231. The injection molding is thus completed (see (a) of FIG. 22).

After the injection molding, the thermoplastic resin 231 is taken out from the mold 232, and is then cut into individual lenses (see (b) of FIG. 22). For convenience, (b) of FIG. 22 deals with a specific case in which the thermoplastic resin 231 taken out from the mold 232 is cut into individual first lenses PL1. Note that the individual second lenses PL2 and the individual third lenses PL3 are also prepared by the method shown in (a) and (b) of FIG. 22.

A first lens PL1, a second lens PL2, and a third lens PL3 are fit (or press-fit) into a lens holder (housing) 233 so as to assemble an image sensing module (see (c) of FIG. 22).

An intermediate product, illustrated in (c) of FIG. 22, of the image sensing module is fit into a lens barrel 234, and is then a sensor 235 (corresponding to the sensor 11) is mounted onto an end on the surface S6 side (see FIG. 2) of the third lens PL3. An image sensing module is thus prepared (see (d) of FIG. 22).

A deflection temperature under loading (heat distortion temperature) of the thermoplastic resin 231 used for the first lens PL1, the second lens PL2, and the third lens PL3, which are injection molding lenses, is about 130° C. The thermoplastic resin 231 therefore does not have a sufficient resistance to a heat history (maximum temperature: about 260° C.) of a reflow, which is a common technique employed for a surface mount. The thermoplastic resin 231 is hence not resistant to heat generated during the reflow.

In view of the circumstances, when the image sensing module illustrated in (d) of FIG. 22 is mounted on a substrate, the following mounting method is employed. Specifically, only the sensor 235 is first mounted by a reflow. Then, (i) the first lens PL1, the second lens PL2, and the third lens PL3 is adhered with use of a resin or (ii) a part of the first lens PL1, the second lens PL2, and the third lens PL3, via which part the lenses are mounted, is locally heated.

Figure 23:
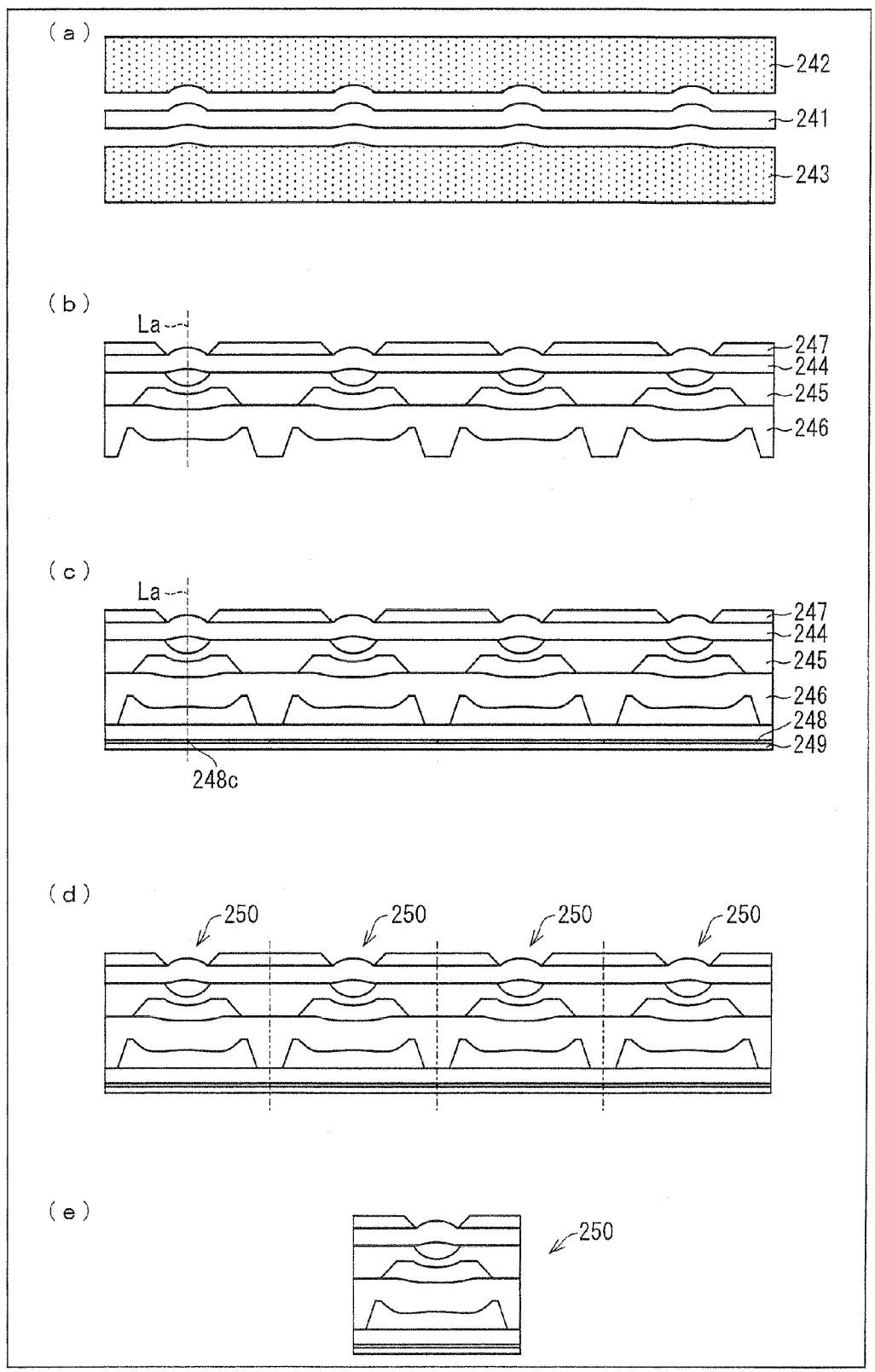
FIG. 23

With reference to (a) through (e) of FIG. 23, the following description deals with a method of the present invention for producing an image sensing module 250.

In recent years, a so-called heat-resistant camera module has been developed in which a first lens PL1, a second lens PL2, and a third lens PL3 are each made of a thermosetting resin or an ultraviolet curing resin. The image sensing module 250 described here is prepared by arranging so that the image sensing module 1 (see FIG. 1) has a configuration of a heat-resistant camera module. As such, the first lens PL1, the second lens PL2, and the third lens PL3 are each made of a thermosetting resin 241, instead of the thermoplastic resin 231 (see (a) of FIG. 22).

The reason why at least one of the first lens PL1, the second lens PL2, and the third lens PL3 is made of a thermosetting resin 241 is that the image sensing module 250 is attempted to be produced at low cost by producing a large number of image sensing modules 250 simultaneously. The reason why all of the first lens PL1, the second lens PL2, and the third lens PL3 are made of a thermosetting resin 241 is that a reflow can be carried out with respect to the image sensing module 250.

Many techniques for producing the image sensing module 250 have been proposed. Representative examples among others are the above-described injection molding and a later-described wafer-level lens process. Of these, the wafer-level lens process (reflowable lenses) has recently been drawing particular attention. This is because the process is considered to be more advantageous in terms of general knowledge including a time for producing an image sensing module and other viewpoints.

In the wafer-level lens process, it is necessary to prevent heat-induced plastic deformation from occurring in the first lens PL1, the second lens PL2, and the third lens PL3. In view of the circumstances, attention has been drawn to wafer level lenses used as the first lens PL1, the second lens PL2, and the third lens PL3. This is because a wafer level lens is made of a thermosetting resin material or an ultraviolet curing resin material, each of which is not easily deformed by heat and is thus excellent in heat resistance. Specifically, attention has been drawn to a wafer level lens which is made of a thermosetting resin material or an ultraviolet curing resin material each of which has a heat resistance sufficient not to be plastically deformed even when it is heated, for 10 seconds or longer, to a temperature falling within a range from 260° C. to 280° C. According to the wafer-level lens process, array-shaped molds 242 and 243 are used to mold each of lens arrays 244 through 246. The lens arrays 244 through 246 thus molded are then combined with one another. Each of an aperture stop array 247 and a sensor array 249 is further mounted in place, and a resulting product is cut into individual image sensing modules 250.

The following description deals with the wafer-level lens process in detail.

In the wafer-level lens process, a thermosetting resin 241 is first sandwiched between (i) an array-shaped mold 242 in which a large number of concavities are formed and (ii) an array-shaped mold 243 in which a large number of convexities are formed which convexities correspond to the respective concavities. The thermosetting resin 241 is then cured. This causes provision of an array-shaped lens made up of lenses each of which is formed for each combination of corresponding concavity and convexity (see (a) of FIG. 23).

The following lens arrays are produced in a step illustrated in (a) of FIG. 23: a lens array 244 in which a large number of first lenses PL1 have been molded; a lens array 245 in which a large number of second lenses PL2 have been molded; and a lens array 246 in which a large number of third lenses PL3 have been molded.

Note that the lens array 244 can be produced in a manner illustrated in (a) of FIG. 23 with use of (i) an array-shaped mold 242 including a large number of concavities each of which has a reversal shape with respect to a first lens PL1 and (ii) an array-shaped mold 243 including a large number of convexities which correspond to the respective concavities. The lens array 245 can be produced in a manner illustrated in (a) of FIG. 23 with use of (i) an array-shaped mold 242 including a large number of concavities each of which has a reversal shape with respect to a second lens PL2 and (ii) an array-shaped mold 243 including a large number of convexities which correspond to the respective concavities. The lens array 246 can be produced in a manner illustrated in (a) of FIG. 23 with use of (i) an array-shaped mold 242 including a large number of concavities each of which has a reversal shape with respect to a third lens PL3 and (ii) an array-shaped mold 243 including a large number of convexities which correspond to the respective concavities.

The lens arrays 244 through 246 are then combined with one another so that (i) an optical axis La (optical axis of the first lens) of a first lens PL1, (ii) an optical axis La (optical axis of the second lens) of a second lens PL2 corresponding to the first lens PL1, and (iii) an optical axis La (optical axis of the third lens) of a third lens PL3 corresponding to the first lens PL1 (see (b) of FIG. 23) coincide with one another on a single line. Other than the method in which the optical axes La coincide with one another, various methods for positioning the lens arrays 244 through 246 can be employed. One of the various methods is a method in which the positions of the respective lens arrays 244 through 246 are adjusted while an image is being sensed. Further, the positioning is affected by finish accuracy of a wafer pitch. During the step illustrated in (b) of FIG. 23, an aperture stop array 247 is attached so that parts of the lens array 244 which parts correspond to surfaces S1 (see FIG. 2) of the respective first lenses PL1 are exposed in respective aperture stops of the aperture stop array 247.

Then, a sensor array 249 in which a large number of sensors 248 are mounted is provided on end of the lens array 246, on the surface S6 (see FIG. 2) side of the respective third lenses PL3, so that each optical axis La and a center 248c of a corresponding sensor 248 are on a corresponding identical straight line (see (c) of FIG. 23).

An array of a large number of image sensing modules 250 prepared in a step illustrated in (c) of FIG. 23 is cut into individual image sensing modules 250 (see (d) of FIG. 23). This completes the preparation of the image sensing module 250 (see (e) of FIG. 23).

By simultaneously preparing a large number of image sensing modules 250 in the above process of preparing wafer level lenses as illustrated in (a) through (e) of FIG. 23, it is possible to reduce cost of preparing the image sensing module 250. Further, to prevent a finished image sensing module 250 from being plastically deformed by heat (maximum temperature: about 260° C.) generated by a reflow when the image sensing module 250 is mounted on a substrate (now shown), it is preferable that the first lens PL1, the second lens PL2, and the third lens PL3 are each made of a thermosetting resin or an ultraviolet curing resin each of which is resistant to heat which has a temperature falling within the range from 260° C. to 280° C. and which is applied for 10 seconds or longer. It is possible to carry out a reflow with respect to the image sensing module 250, by using a heat-resistant thermosetting resin or a heat-resistant ultraviolet curing resin as a material of each of the first lens PL1, the second lens PL2, and the third lens PL3. In addition, by using a heat-resistant resin material for a wafer level production process, it is possible to inexpensively produce an image sensing module with respect to which a reflow can be carried out.

The following description deals with a material of each of the first lens PL1, the second lens PL2, and the third lens PL3 which material is suitable for production of the image sensing module 250.

Thermoplastic resins have been conventionally used as plastic lenses. Thus, it is possible to have a large selection of thermoplastic resins.

In contrast, thermosetting resin materials and ultraviolet curing resin materials are still under development for the first lens PL1, the second lens PL2, and the third lens PL3. In the circumstances, such materials are inferior to the thermoplastic materials in their available kinds, optical constants, and price. Generally, it is preferable that a material of each of the first lens PL1 through third lens PL3 has optical constants such as a low refractive index and a low dispersion. Further, there is preferably a wide range of options for optical constants, in terms of optical design.

The image sensing module of the present invention may be arranged such that the image sensing element is capable of supplying only information on pixels which is obtained from a green monochromatic radiation.

With the above arrangement, it is possible to read a two-dimensional matrix code by a reading process based on the information, supplied from the image sensing element, on pixels formed by the green monochromatic radiation.

The image sensing module of the present invention may be arranged such that the image sensing element is provided in a location of a best image surface of the imaging lens which best image surface is obtained from a green monochromatic radiation which is received from the first object.

With the above arrangement, it is possible to recognize, with use of the image sensing element, a two-dimensional matrix code having a fine pattern. As such, it is possible to read a two-dimensional matrix code having a fine pattern.

The image sensing module of the present invention may be arranged such that the image sensing element has a pixel pitch of not more than 2.5 μm.

With the arrangement, it is possible to produce an image sensing module which sufficiently utilizes a capability of the image sensing element having a large number of pixels.

The image sensing module of the present invention may be arranged such that the imaging lens is mounted on the image sensing element via a protecting member by which the image sensing element is protected.

With the arrangement, a case (housing) for containing the imaging lens can be omitted from the image sensing module. By thus omitting such a case, it is possible to produce an image sensing module which is downsizing, low in height and cost.

The image sensing module of the present invention may be arranged such that the imaging lens has an f-number of not more than 3.

With the arrangement, it is possible to increase an amount of received light. As such, it is possible to brighten an image. Further, a chromatic aberration is appropriately corrected. This makes it possible to obtain a high resolving power.

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

INDUSTRIAL APPLICABILITY

The present invention is suitably applicable to (i) an image sensing module which is arranged so as to have a resolving power enough to meet required specifications for both photographing a close object and photographing a far object, and (ii) an imaging lens suitably included so as to build the image sensing module.

REFERENCE SIGNS LIST 1 image sensing module
2 sensor location (location in which an image sensing element is provided)
3 location of a best image surface of an imaging lens with respect to white light from a sunflower
4 location of a best image surface of the imaging lens with respect to white light from a tree
5 sunflower (object close to the image sensing module)
6 tree (object far from the image sensing module)
10 imaging lens
11 sensor (image sensing element)
142 G (pixel formed by a green monochromatic radiation)
P pixel pitch of the sensor

The invention claimed is:
1. An image sensing module, comprising:
an imaging lens having an increased depth of field and a decreased curvature of field due to: (a) the imaging lens having three lenses and including, as arranged in order from an object side to an image surface side, an aperture stop, a first lens, a second lens, and a third lens, (b) the second lens being a meniscus lens having a concave surface facing the object side, (c) the second lens and the third lens each being an aspheric lens, (d) the first lens and the third lens each having an Abbe number larger than an Abbe number of the second lens, and (e) the first lens having a positive refracting power, the second lens having a negative refracting power, the third lens having a surface facing the image surface side, the surface having an inflection point at which a curvature direction changes either from a concave shape to a convex shape or from a convex shape to a concave shape; and
an image sensing element provided between (i) a location of a best image surface of the imaging lens which best image surface is obtained when the imaging lens receives white light from a first object which is closer to the image sensing element than a predetermined distance and (ii) a location of a best image surface of the imaging lens where the best image surface is obtained when the imaging lens receives white light from a second object which is farther from the image sensing element than the predetermined distance.

2. The image sensing module according to claim 1, wherein the image sensing element supplies only information for particular pixels wherein said information is obtained from a green monochromatic radiation.

3. The image sensing module according to claim 2, wherein the image sensing element is provided in a location of the best image surface of the imaging lens which best image surface is obtained from a green monochromatic radiation which is received from the first object.

4. The image sensing module according to claim 1, wherein the image sensing element has a pixel pitch of not more than 2.5 μm.

5. The image sensing module according to claim 1, wherein the imaging lens is mounted on the image sensing element via a protecting member by which the image sensing element is protected.

6. The image sensing module according to claim 1, wherein the imaging lens has an f-number of not more than 3.

7. An imaging lens, comprising:
the imaging lens having an increased depth of field and a decreased curvature of field due to: (a) the imaging lens having three lenses and including, as arranged in order from an object side to an image surface side, an aperture stop, a first lens, a second lens, and a third lens, (b) the second lens being a meniscus lens having a concave surface facing the object side, (c) the second lens and the third lens each being an aspheric lens, (d) the first lens and the third lens each having an Abbe number larger than an Abbe number of the second lens, and (e) the first lens having a positive refracting power, the second lens having a negative refracting power, the third lens having a surface facing the image surface side, the surface having an inflection point at which a curvature direction changes either from a concave shape to a convex shape or from a convex shape to a concave shape, said imaging lens forming an image of an object between (i) a location of a best image surface which is obtained when the imaging lens receives white light from the object which is closer to an image forming location than a predetermined distance and (ii) a location of a best image surface where the best image surface is obtained when the imaging lens receives white light from the object which is farther from the image forming location than the predetermined distance.

8. A code reading method for reading, with use of an image sensing module, a two-dimensional matrix code on a basis of information for particular pixels wherein said information is obtained from a green monochromatic radiation, the image sensing module comprising:

an imaging lens having an increased depth of field and a decreased curvature of field due to: (a) the imaging lens having three lenses and including, as arranged in order from an object side to an image surface side, an aperture stop, a first lens, a second lens, and a third lens, (b) the second lens being a meniscus lens having a concave surface facing the object side, (c) the second lens and the third lens each being an aspheric lens, (d) the first lens and the third lens each having an Abbe number larger than an Abbe number of the second lens, and (e) the first lens having a positive refracting power, the second lens having a negative refracting power, the third lens having a surface facing the image surface side, the surface having an inflection point at which a curvature direction changes either from a concave shape to a convex shape or from a convex shape to a concave shape; and an image sensing element provided between (i) a location of a best image surface of the imaging lens where the best image surface is obtained when the imaging lens receives white light from a first object which is closer to the imaging lens than a predetermined distance and (ii) a location of a best image surface of the imaging lens where the best image surface is obtained when the imaging lens receives white light from a second object which is farther from the imaging lens than the predetermined distance, the image sensing element supplying only information for particular pixels wherein said information is obtained from the green monochromatic radiation, said code reading method, comprising the steps of:

finding, on a basis of a pitch of the pixels which is obtained when the green monochromatic radiation is received, first and second values of respective critical resolving performances of the imaging lens and the image sensing element so as to set, as a value of a critical resolving performance of the image sensing module, the first value or the second value, whichever is lower;

finding a magnification at which an image is formed by the imaging lens, on a basis of (i) a distance between the imaging lens and the first object, (ii) an angle of view of the image sensing module, and (iii) an image circle diameter of the image sensing element; and finding a size of a two-dimensional matrix code which the image sensing module can read, on a basis of (i) the value of the critical resolving capability of the image sensing module and (ii) the magnification.

* * * * *